United States Patent
Chang

(10) Patent No.: US 11,898,816 B2
(45) Date of Patent: *Feb. 13, 2024

(54) MUZZLE FLASH SIMULATOR

(71) Applicant: Acetk Corp Ltd., Taipei (TW)

(72) Inventor: Yung-Hui Chang, New Taipei (TW)

(73) Assignee: ACETK CORP LTD., Taipei (TW)

(*) Notice: Subject to any disclaimer, the term of this patent is extended or adjusted under 35 U.S.C. 154(b) by 0 days.

This patent is subject to a terminal disclaimer.

(21) Appl. No.: 18/184,718

(22) Filed: Mar. 16, 2023

(65) Prior Publication Data

US 2023/0235987 A1 Jul. 27, 2023

Related U.S. Application Data

(63) Continuation of application No. 17/542,555, filed on Dec. 6, 2021, now Pat. No. 11,644,268, which is a continuation-in-part of application No. 17/383,401, filed on Jul. 22, 2021, now Pat. No. 11,215,419.

(60) Provisional application No. 63/122,484, filed on Dec. 8, 2020.

(51) Int. Cl.
*F41A 33/02* (2006.01)
*H05B 47/105* (2020.01)

(52) U.S. Cl.
CPC ............ *F41A 33/02* (2013.01); *H05B 47/105* (2020.01)

(58) Field of Classification Search
CPC .......... F41A 33/02; F41A 33/04; F41A 33/06; H05B 47/16; H05B 47/115; F21S 10/06; F21V 14/02; F21W 2131/406; F21Y 2115/10; F21A 21/32; F21A 21/34; F21G 11/00; F21G 3/2655; F41J 5/02; H04W 4/80

See application file for complete search history.

(56) References Cited

U.S. PATENT DOCUMENTS

| 9,746,272 B2* | 8/2017 | Lowrance | F41A 33/02 |
| 10,041,757 B2* | 8/2018 | Grossnickle | F41B 6/003 |
| 2016/0169627 A1* | 6/2016 | Northrup | F41G 3/2633 434/22 |
| 2018/0163949 A1* | 6/2018 | Joseph | F21V 23/0407 |

FOREIGN PATENT DOCUMENTS

WO 2017067747 A1 4/2017

* cited by examiner

*Primary Examiner* — Alexander H Taningco
*Assistant Examiner* — Pedro C Fernandez
(74) *Attorney, Agent, or Firm* — McClure, Qualey & Rodack, LLP

(57) ABSTRACT

A muzzle flash simulator for use in an airsoft gun, comprising an internal passage, a detector, a controller, and multiple illuminating components. In response to a projectile passing through and away from the internal passage, the simulator will be triggered and flash multi-color lights on a projectile passage in front of the simulator. When each color light is illuminated on the moving projectile at a specific intensity at specified time periods, because of an afterimage phenomenon of the human eye, the surface of the moving projectile reflects the corresponding color and leaves a multi-layered light-trail accordingly.

1 Claim, 22 Drawing Sheets

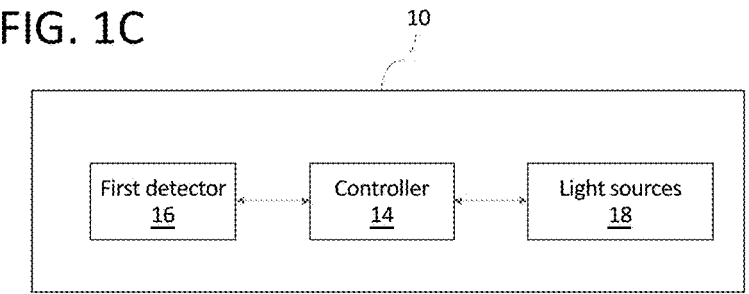
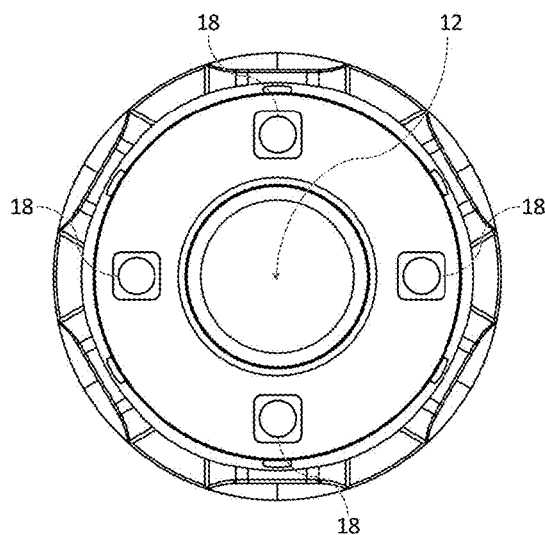
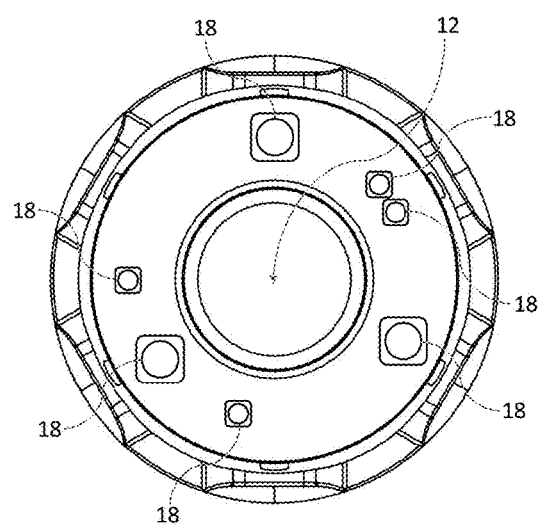
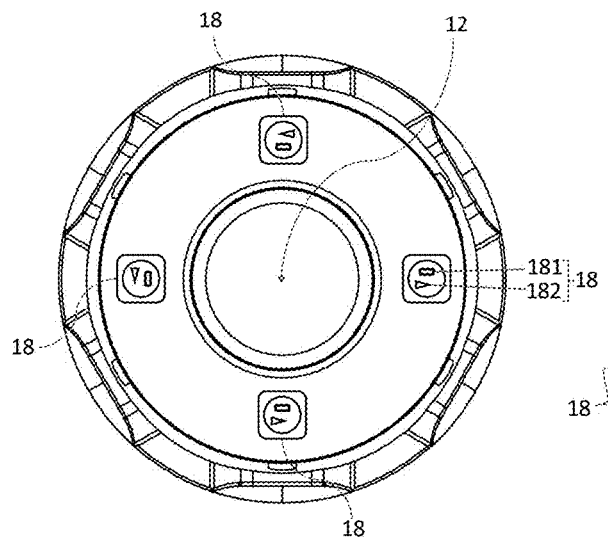
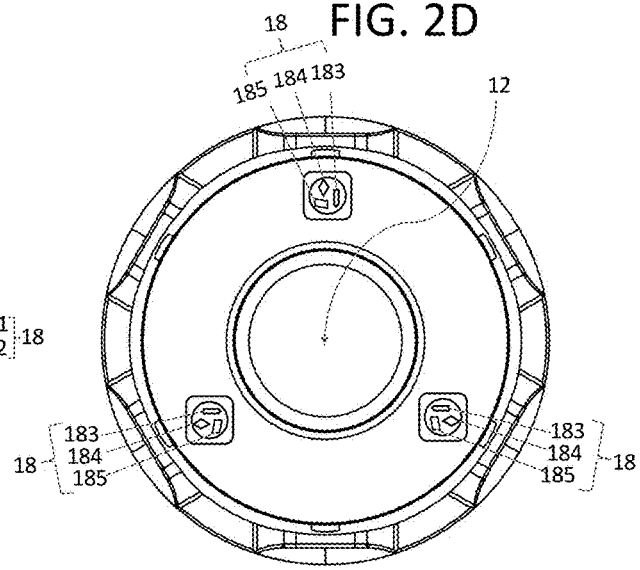

FIG. 4E
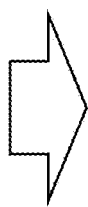
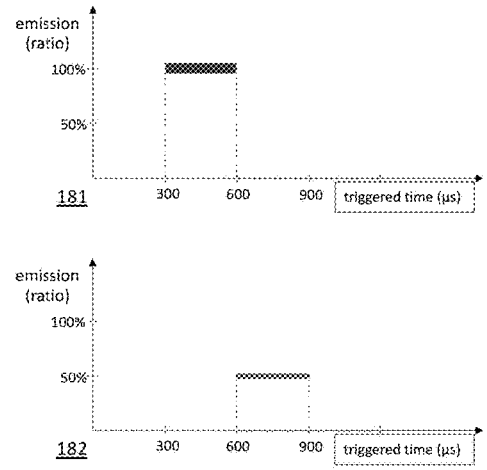
FIG. 4F
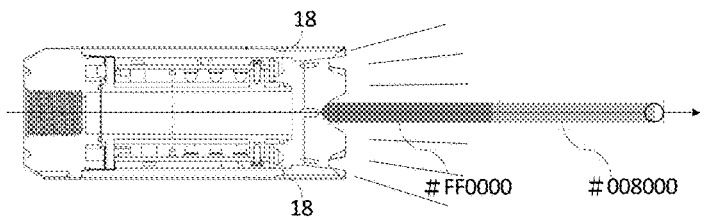
FIG. 4G
| component \ time period | 300μs ~ 900μs | 900μs ~ 1500μs |
|---|---|---|
| 181 | 100% | 50% |
| component \ time period | 600μs ~ 1200μs | 1200μs ~ 1800μs |
|---|---|---|
| 182 | 50% | 100% |
104

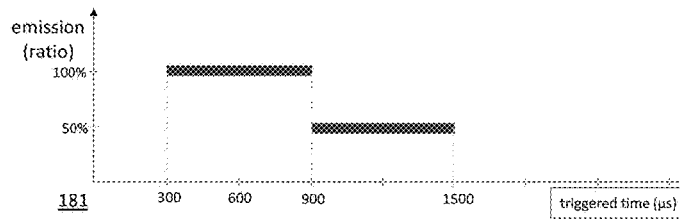
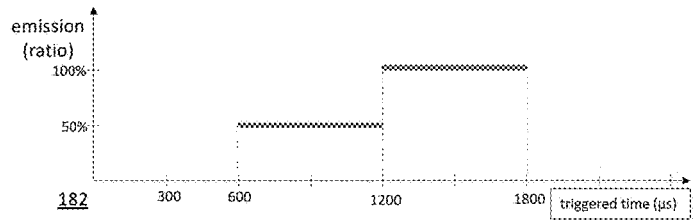
FIG. 4H
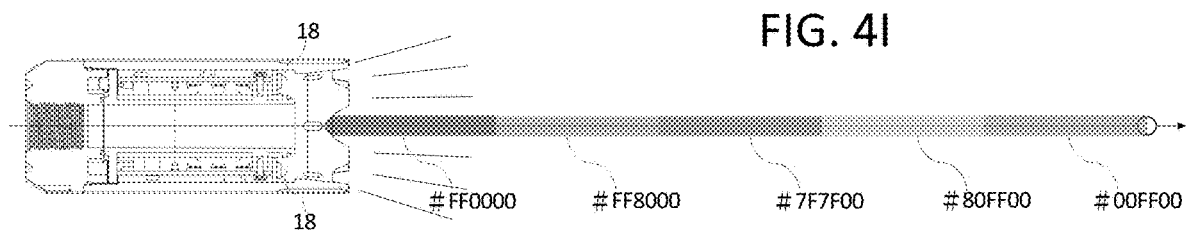
FIG. 4I
FIG. 4J
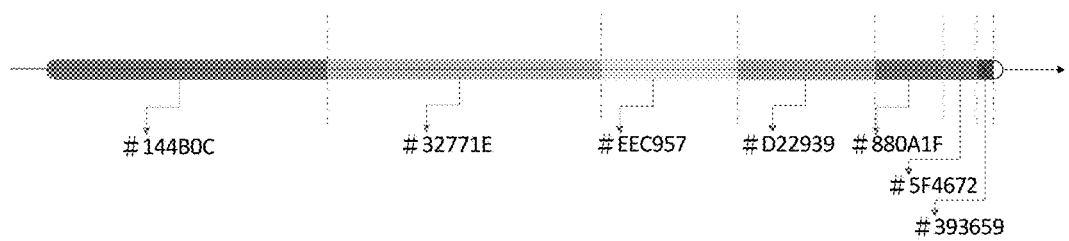

FIG. 5K

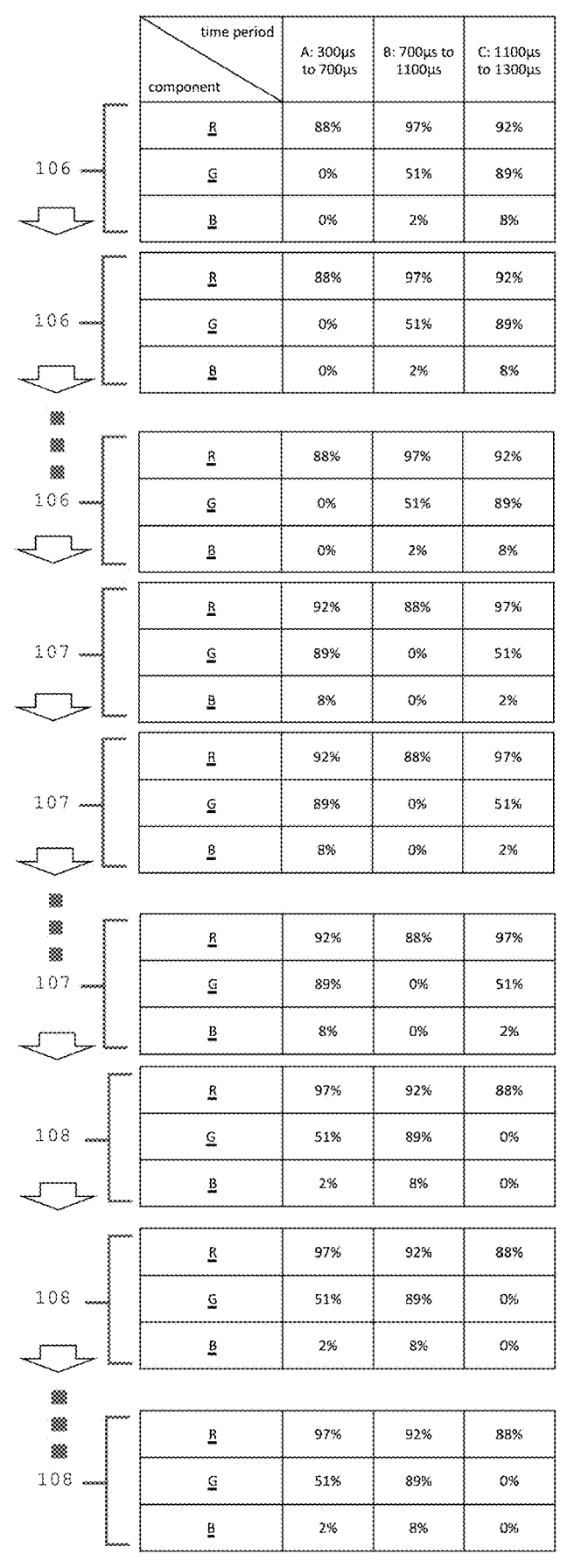

| component \ time period | A: 300μs to 700μs | B: 700μs to 1100μs | C: 1100μs to 1300μs |
|---|---|---|---|
| R | 88% | 97% | 92% |
| G | 0% | 51% | 89% |
| B | 0% | 2% | 8% |

106

| R | 88% | 97% | 92% |
|---|---|---|---|
| G | 0% | 51% | 89% |
| B | 0% | 2% | 8% |

106

⋮

| R | 88% | 97% | 92% |
|---|---|---|---|
| G | 0% | 51% | 89% |
| B | 0% | 2% | 8% |

106

| R | 92% | 88% | 97% |
|---|---|---|---|
| G | 89% | 0% | 51% |
| B | 8% | 0% | 2% |

107

| R | 92% | 88% | 97% |
|---|---|---|---|
| G | 89% | 0% | 51% |
| B | 8% | 0% | 2% |

107

⋮

| R | 92% | 88% | 97% |
|---|---|---|---|
| G | 89% | 0% | 51% |
| B | 8% | 0% | 2% |

107

| R | 97% | 92% | 88% |
|---|---|---|---|
| G | 51% | 89% | 0% |
| B | 2% | 8% | 0% |

108

| R | 97% | 92% | 88% |
|---|---|---|---|
| G | 51% | 89% | 0% |
| B | 2% | 8% | 0% |

108

⋮

| R | 97% | 92% | 88% |
|---|---|---|---|
| G | 51% | 89% | 0% |
| B | 2% | 8% | 0% |

108

FIG. 9C
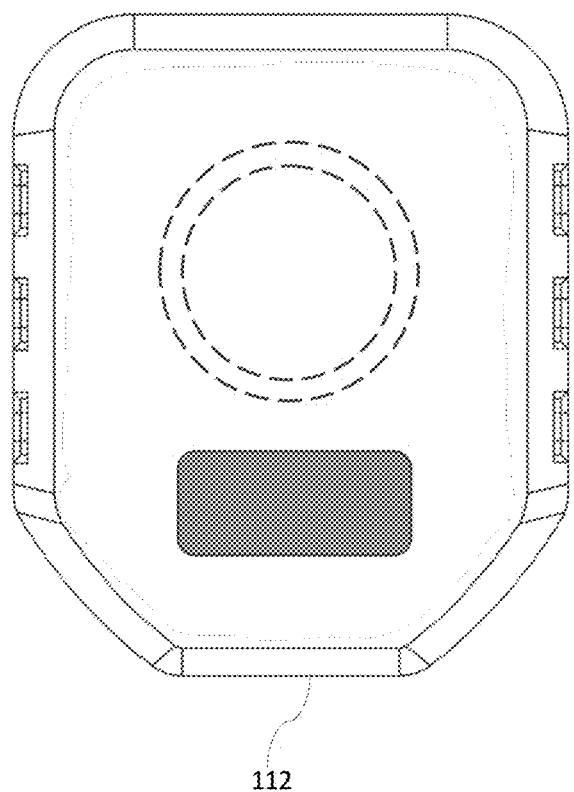
112
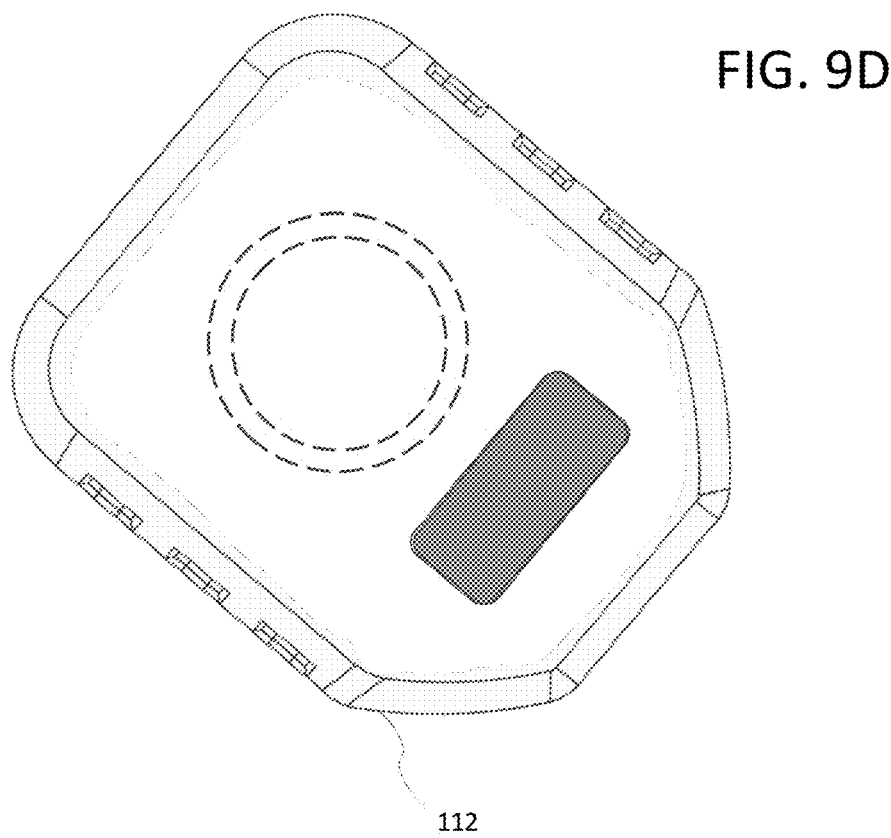
FIG. 9D
112

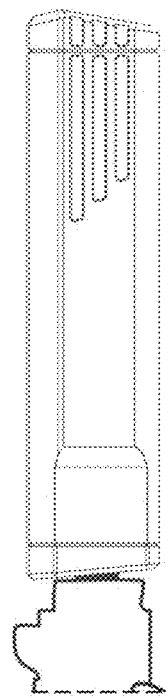
FIG. 10A
FIG. 10B
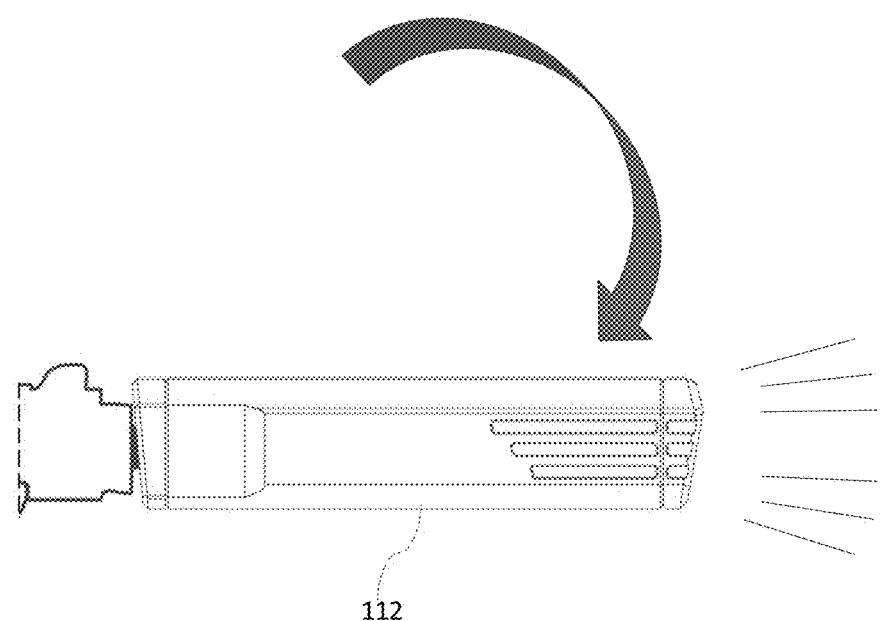

MUZZLE FLASH SIMULATOR

CROSS REFERENCE TO RELATED APPLICATIONS

This application is a continuation of U.S. application Ser. No. 17/542,555, filed Dec. 6, 2021, which claims priority to U.S. Provisional Application No. 63/122,484, filed Dec. 8, 2020, and U.S. patent application Ser. No. 17/383,401 (now U.S. Pat. No. 11,215,419), filed Jul. 22, 2021, each of which is hereby incorporated by reference in its entirety.

BACKGROUND OF THE INVENTION

1. Field of the Invention

The present invention relates to a muzzle flash simulator for airsoft guns, and more particularly to a muzzle flash simulator capable of leaving light trails.

2. Description of the Prior Art

Tracer units (e.g., ACETECH Tracer Unit: AT1000) can often be seen when playing MilSim games. Irradiating the airsoft tracer BBs (i.e., tracer projectile, which have the same chemicals as 'glow in the dark' powder and paints) with UV light when the tracer BBs pass through the interior of tracer units, so that the tracer BBs continue to glow for a short period of time after leaving the tracer units.

SUMMARY OF THE INVENTION

The present invention provides a different kind of visual effect: muzzle flash effect, to simulate the visual effect of real firearm caused by the sudden release of high temperature gas from the muzzle during shooting. The present invention doesn't need said tracer BBs. Normal white projectile (e.g., plastic BBs) will be able to achieve the muzzle flash effect.

In some embodiments, a muzzle flash simulator for briefly illuminating light on a projectile passage in front of the muzzle flash simulator when triggered, includes: an internal passage disposed through the muzzle flash simulator, wherein the projectile passage extends along the internal passage; a first detector coupled to a controller and configured to transmit a trigger signal to the controller in response to detecting a projectile passing through the internal passage; a first illuminating component coupled to the controller and a second illuminating component coupled to the controller. The color or intensity of each one of the illuminating components (the first illuminating component and the second illuminating component) is tunable and can be precisely controlled by the controller.

In such a manner, the muzzle flash simulator may be disposed at the airsoft gun's front end (the muzzle end of the barrel), wherein the projectile passage extends along the internal passage. When the airsoft gun fires a projectile, the projectile passes through and away from the internal passage of the muzzle flash simulator, the muzzle flash simulator will be triggered, and then at least two colors of flashes briefly illuminate the projectile passage in front of the muzzle flash simulator. When the light of the individual color is briefly illuminated on the moving projectile at a specific time period, because of an afterimage phenomenon of the human eye, the surface of the moving projectile reflects the corresponding color and a trail having a mixed color could be obtained.

when the controller receives the trigger signal transmitted by the first detector, the controller may use a basic set of instructions to transmit the illuminating commands, and each instruction of the basic set of instructions includes a setting value for each one of the illuminating components (e.g., the first illuminating component and the second illuminating component) at an indicated time period. Thus, the controller indicates the time periods of the illuminating components individually. The surface of the moving projectile reflects the corresponding specific mixed color at specific time periods to obtain a multi-layer light beam.

BRIEF DESCRIPTION OF THE DRAWINGS

For a more complete understanding of this disclosure and its advantages, reference is now made to the following description, taken in conjunction with the accompanying drawings, in which:

FIGS. 1A-1C illustrate an embodiment, when the projectile passes through and away from the muzzle flash simulator, uses the afterimage phenomenon of the human eye to leave a trail of light.

FIGS. 2A-2F are front views showing at least one illuminating component outside of an internal passage in accordance with some embodiments, to mix a specific color on the surface of the moving projectile at specific time periods.

FIGS. 4A-4K illustrate how to leave a multi-layer rainbow (Bifrost) trace when triggered.

FIGS. 5A-5K illustrate embodiments for activating dynamic beam effects when subsequent shots are triggered.

FIGS. 9A-9E illustrate the light device may automatically switch to predefined mode according to detected angle variations.

FIGS. 10A and 10B illustrate the light device may automatically switch to the predefined mode according to predefined gestures.

DETAILED DESCRIPTION

Figure 1A:
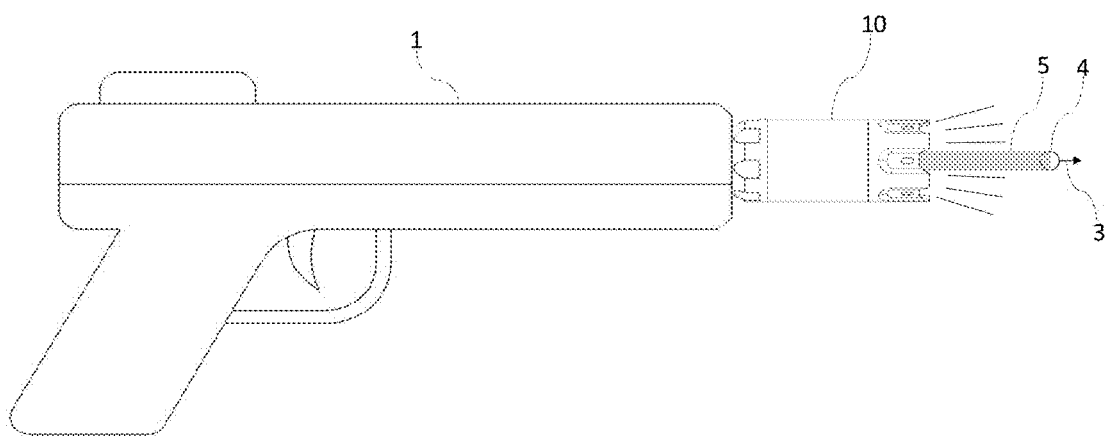

Please refer to FIG. 1A, a muzzle flash simulator 10 (hereinafter simply referred to as a "simulator 10") may be applied to an airsoft gun 1 (e.g., simulation gun, electric toy gun, paintball gun, gel blaster, and the like) for briefly illuminating light on a projectile passage 3 (hereinafter simply referred to as a "passage 3") in front of the simulator 10 when triggered. When a moving projectile 4 is illuminated on the passage 3, the surface of the moving projectile 4 reflects a respective color, and then a trail 5 could be obtained by utilizing an afterimage phenomenon on eyes. The simulator 10 could be preferably implemented with a flash hider/suppressor/silencer/oppressor design (such as the Bifrost series from ACETECH).

Figure 1B:
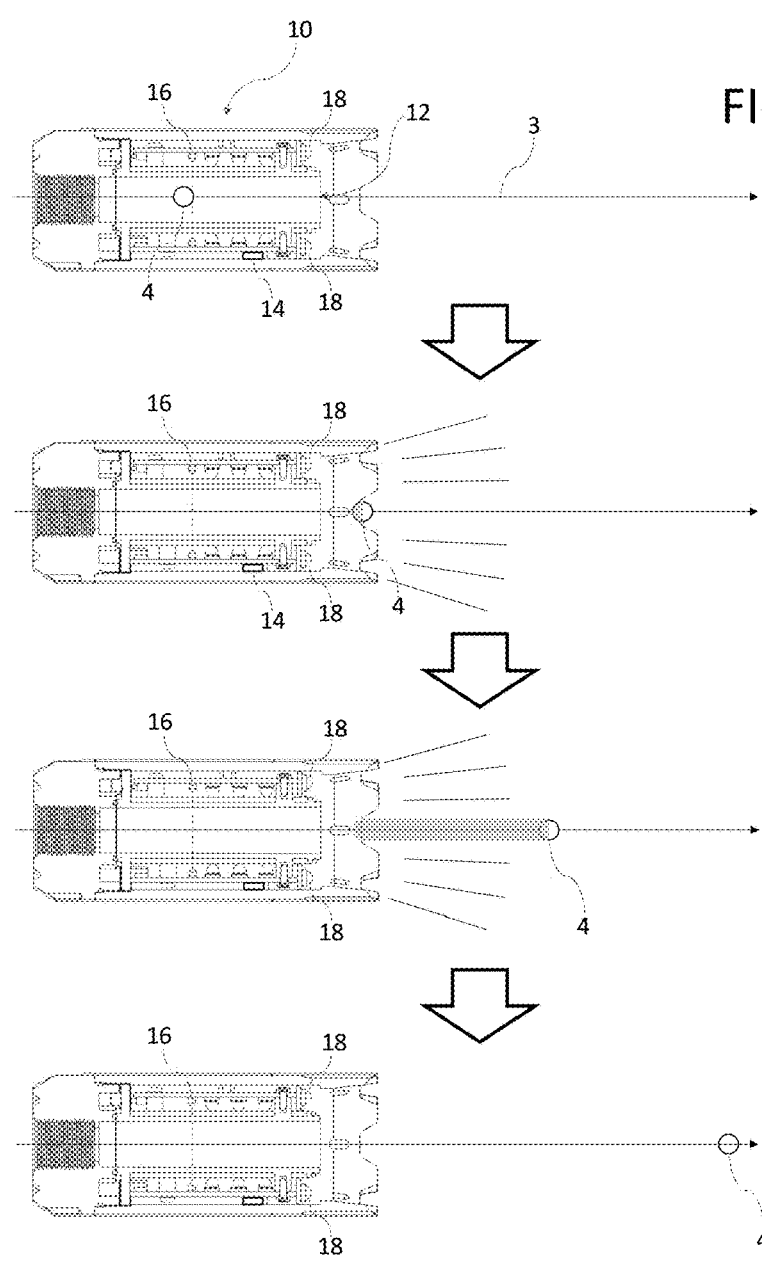

FIG. 1B shows various cross-section views of the projectile 4 when it passes through and away from the simulator 10. The simulator 10 may include one flash light source 18 (hereinafter simply referred to as a "light source 18"), a controller 14, a first detector 16, and an internal passage 12 disposed through the simulator 10 wherein the passage 3 extends along the passage 12.

Referring to FIG. 1B and FIG. 1C, the first detector 16 may be disposed in the simulator 10 and coupled to the controller 14. The detector 16 is configured to transmit a trigger signal to the controller 14 in response to detecting a projectile 4 passing through the passage 12 at a predetermined location. The at least one illuminating component is also coupled to the controller 14. In response to receiving the trigger signal from the detector 16, the controller 14 indicates the illuminating component for illuminating the passage 3 at specific time periods. In one embodiment, as shown in FIG. 2A, there are four light sources 18 disposed outside of the passage 12 in a radial arrangement for illuminating the projectile 4 passing away from the passage 12. The light source 18 may also be disposed inside the internal passage 12 as long as it can illuminate the projectile 4 passing away from the passage 12. The light sources 18 may be disposed outside of the passage 12 in a non-radial arrangement (e.g., randomly located configuration), as shown in FIG. 2B, to further simulate the visual effect caused by sudden release of high temperature gas from the muzzle of real firearm.

FIG. 2C shows an example implementation, in which each of the light sources 18 may include a first illuminating component 181 coupled to the controller 14, and a second illuminating component 182 coupled to the controller 14. The color or intensity of each illuminating component is tunable and can be precisely controlled by the controller 14. The light source 18 is not limited to include two tunable illuminating components. It may include three or more tunable illuminating components. In another embodiment, as shown in FIG. 2D, each light source 18 includes three LEDs of different colors (e.g., RGB LED or multicolored LED). Specifically, each light source 18 includes a red illuminating component 183, a green illuminating component 184, and a blue illuminating component 185. More tunable illuminating components can mix more different color combinations. If the red illuminating component 183 has 255 tunable options and the green illuminating component 184 has 255 tunable options, the controller 14 can control the illuminating components to mix 255*255 different color combinations. Each tunable option may be a value of intensity (or color) of each illuminating component. Other options may be used; these two are provided as examples only and are not intended to be limiting.

Figure 2E:
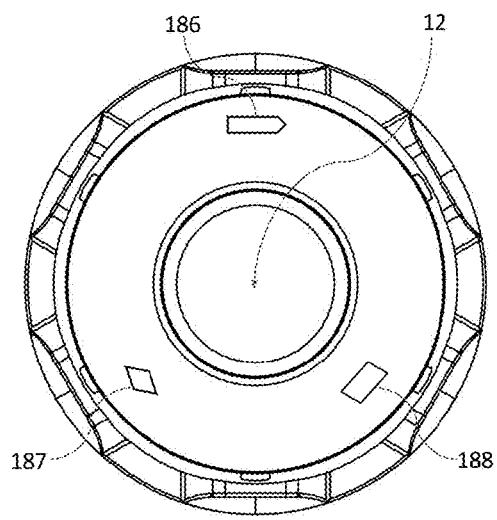
Figure 2F:
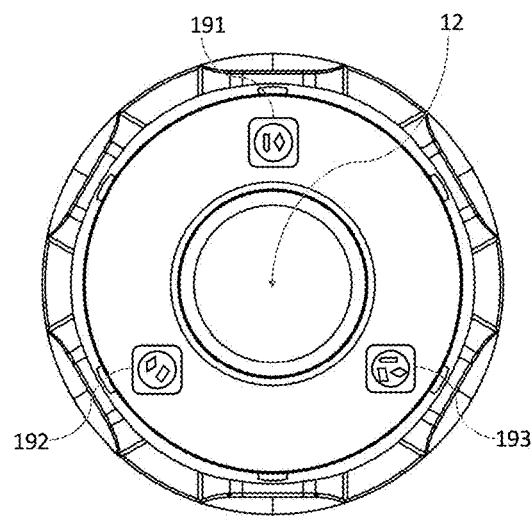

The light source 18 may be a combination of the different illuminating components, as shown in FIG. 2E. A illuminating component 186 is a red LED. A illuminating component 187 is a green LED. A illuminating component 188 is a blue LED. In other embodiments, each light source 18 may be a combination of two, or more than two light sources, as shown in FIG. 2F. A light source 191 is a combination of green and red LEDs; a light source 192 is a combination of green and blue LEDs; and a light source 193 is a combination of red, green and blue LEDs. An advantage of the present invention is that there is no need to dispose the illuminating components within a close enough configuration. When each illuminating component illuminates on the moving projectile 4, even if the illuminating components are disposed far away from each other (e.g., more than one centimeter), the surface of moving projectile 4 still reflects colors. The trail 5 having a mixed color could still be obtained.

Figure 3A:
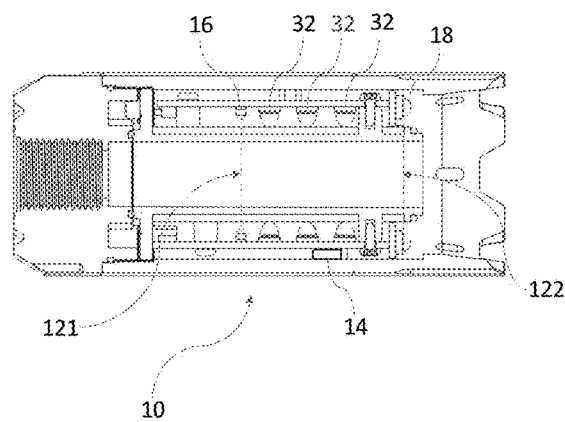
FIGS. 3A-3C illustrate an embodiment further comprising a tracer light source and the timing of flashing the light sources may be different by taking a delay time into consideration, so that the capacitance of the muzzle flash simulator has enough time to charge and discharge.
Figure 3B:
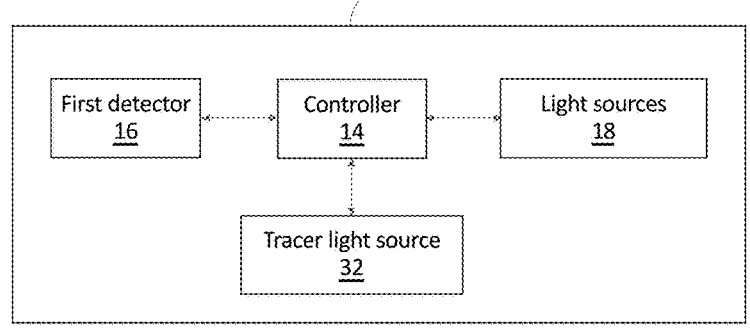

As shown in FIGS. 3A and 3B, the simulator 10 may further include a plurality of tracer light sources 32. The plurality of tracer light sources 32 may be arranged in a row (in parallel to the passage 12) and coupled to the controller 14. The plurality of tracer light sources 32, when triggered by the detector 16, charge a tracer projectile (not shown, e.g., tracer BB, which is infused with phosphorescent material that absorbs lights) as it passes through the internal passage 12 which makes it glow for a while after leaving the simulator 10. It should be noted that the present invention doesn't need said tracer projectile for obtaining said muzzle flash effect. Normal white projectile (e.g., plastic BBs) will be able to achieve the muzzle flash effect. The direction of illumination of the tracer light source 32 is different from the direction of illumination of said light sources 18. The direction of illumination of said light sources may be perpendicular (but not limited to) to each other. As long as different light sources have an angle of more than 45 degrees between each other. It may be applied to the present invention. The wavelength of the tracer light source 32 may be different from the wavelength of said light source 18. In an embodiment, the tracer light source 32 includes at least one Deep UV (DUV) LED, to produce a wavelength different from the wavelength of light source 18. The Deep UV LED is the kind of light source particularly suitable for the situation (when charging the tracer projectile). The timing of activating the light sources 32 and 18 may be different by taking a delay time into consideration, to reduce unnecessary power consumption. The simulator 10 of the invention is an accessory that can be configured in a small, compact volume for use with the muzzle of airsoft guns. The space inside simulator 10 can only be installed with a minimum number of capacitors. How fast the different airsoft guns can fire the next shot will vary on devices: between about 27 ms and 100 ms. Even the same airsoft gun can fire projectiles at different time intervals via the user's choice. When the user fires the projectile continuously for a short time, there are dozens (or even hundreds) of projectiles within a few seconds to continuously trigger the said muzzle flash effect, and the activation timing difference between the different light sources (effective utilization of time difference) can be used to make the capacitor have enough time to charge and discharge.

Figure 3C:
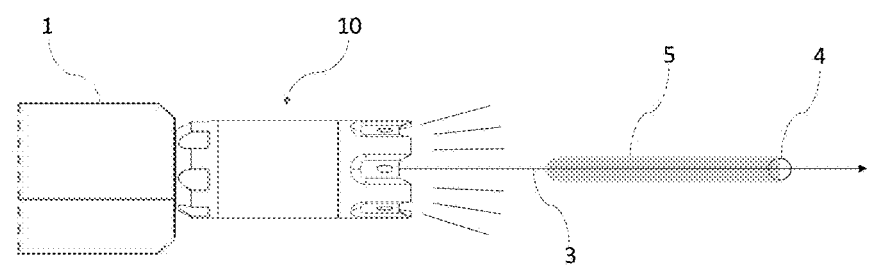

As shown in FIG. 3C, when illuminating light on the moving projectile 4 too late, there will be a gap (which is undesired) between the simulator 10 and the trail 5. But, illuminating light on the projectile 4 too early (before the projectile 4 reaching a plane 122 where the light source 18 is located, as illustrated in FIG. 3A) will cause unnecessary power consumption. In another embodiment (not shown), a muzzle detector (not shown) may be installed close to the plane 122 of the light sources 18, when the projectile 4 is detected to pass, the light sources 18 is immediately triggered, there will be no gap between the simulator 10 and the trail 5.

Figure 4A:
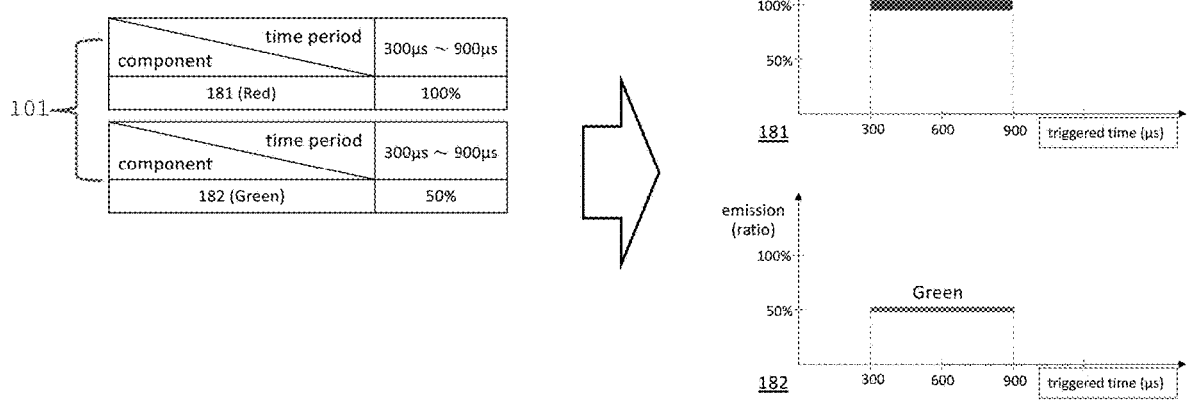
Figure 4B:
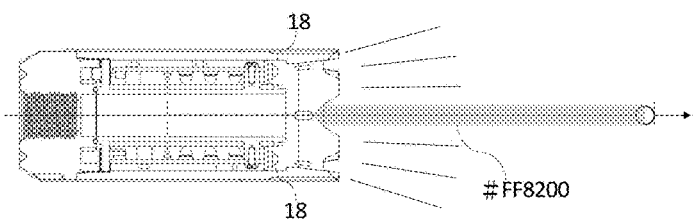

FIGS. 4A and 4B illustrate how the controller 14 indicates the time periods of the illuminating components individually in response to receiving the trigger signal from the first detector 16. In the present embodiment, the first illuminating component 181 may be (but not limited to) a red LED; the second illuminating component 182 may be (but not limited to) a green LED. When the first detector 16 detects that the projectile 4 passes through the passage 12 at a predetermined position (a plane 121 where the detector 16 is located, as illustrated in FIG. 3A), the controller 14 receives the trigger signal transmitted from the detector 16, and then uses a first set of instructions 101 as the basic set of instructions, to transmit illuminating commands to the illuminating components (e.g., the first illuminating component 181 and the second illuminating component 182) individually. The first set of instructions 101 includes a first instruction and a second instruction. The first instruction includes a setting value (e.g., 100% emission ratio) at the indicated time period (e.g., 300 μs~900 μs) for illuminating component 181. The second instruction includes a setting value (e.g., 50% emission ratio) at the indicated time period (e.g., 300 μs~900 μs) for illuminating component 182. In such a manner, the simulator 10 can emit desired light options briefly at the indicated time period for leaving an orange light mixing trail #FF8200, as shown in FIG. 4B, and generate a single-layer light beam.

To distinguish trails having different colors in present application, the reference number of each trail having specific color will be hereinafter represented by the value of corresponding Hex color code.

Figure 4C:
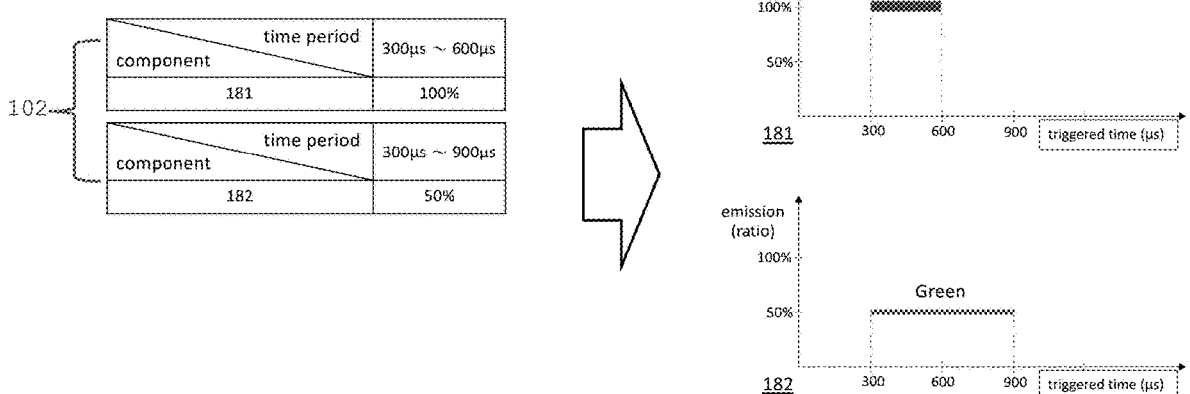
Figure 4D:
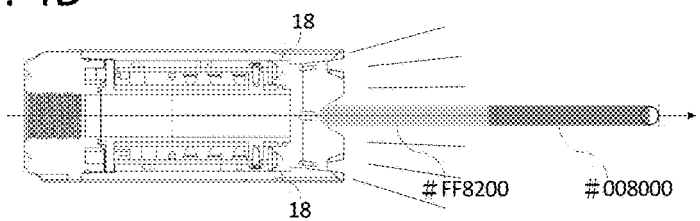

The period values of the indicated time periods need not be the same. The controller 14 may adjust each period value, depending on the desired color-changing timing, to obtain a multi-layer light beam. In an embodiment, as shown in FIG. 4C, the controller 14 uses a second set of instructions 102 as the basic set of instructions, to transmit illuminating commands having different period values of indicated time periods. The second set of instructions 102 includes a third instruction and a fourth instruction. The third instruction includes a setting value (e.g., 100% emission ratio) at the indicated time period (e.g., 300 μs~600 μs) for illuminating component 181. The fourth instruction includes a setting value (e.g., 50% emission ratio) at the indicated time period (e.g., 300 μs~900 μs) for illuminating component 182. In such a manner, the simulator 10 can emit desired light options having different period values of the indicated time periods for generating the multi-layer light beam. As shown in FIG. 4D, the light mixing trail #FF8200 and a green light trail #008000 could be obtained in order, by using the basic set of instructions having different period values of the indicated time periods, to transmit illuminating commands.

The simulator 10 of the foregoing embodiment may comprise: the internal passage 12, disposed through the simulator 10 (and coaxial with the projectile passage 3; the first detector 16, coupled to the controller 14 and configured to transmit the trigger signal to the controller 14 in response to detecting the projectile 4 passing through the internal passage 12; the light sources 18, configured to briefly illuminate light on the projectile passage 12 in front of the simulator 10 after triggered, may comprise the first illuminating component 181 coupled to the controller 14; and the second illuminating component 182 coupled to the controller 14. Said illuminating components are tunable and precisely controlled by the controller 14.

In response to receiving the trigger signal from the first detector 16, the controller 14 may transmit illuminating commands to said illuminating components; the controller 14 may use a basic set of instructions to transmit illuminating commands, and each instruction of the basic set of instructions includes a setting value for each one of the illuminating components at an indicated time period to instruct the luminous intensity of each illuminating component at each specified time period.

In such a manner, the simulator 10 may be attached to the muzzle of airsoft guns. When firing, the projectile 4 passes through and away from the internal passage 12 of the simulator 10 (the simulator 10 will be triggered and at least two colors of lights briefly illuminated on the passage 3 in front of the simulator 10), the light of each color is briefly illuminated on the moving projectile 4 during a specific time, the surface of the moving projectile 4 reflects the corresponding color. Due to the afterimage phenomenon of human eye, the residual effect of color mixing will be felt, and a color mixing trace will be briefly left.

When the light of individual colors is illuminated on the moving projectile 4 at a specific intensity at each specified time period, the surface of the moving projectile 4 reflects the corresponding mixed color according to the time period, which can further leave a multi-layer light trace.

The indicated time periods need not be the same. As shown in FIG. 4E, the controller 14 may indicate different time periods, depending on the desired color-changing timing, to obtain the multi-layer light beam. In an embodiment, the controller 14 uses a third set of instructions 103 as the basic set of instructions, to transmit illuminating commands having different indicated time periods. The third set of instructions 103 includes a fifth instruction and a sixth instruction. The fifth instruction includes a setting value (e.g., 100% emission ratio) at one indicated time period (e.g., 300 μs~600 μs) for illuminating component 181. The sixth instruction includes a setting value (e.g., 50% emission ratio) at another indicated time period (e.g., 600 μs~900 μs) for illuminating component 182. In such a manner, the simulator 10 can emit desired light options having different indicated time periods for generating the multi-layer light beam. As shown in FIG. 4F, the red light trail #FF0000 and green light trail #008000 could be obtained in order, by using the basic set of instructions having different indicated time periods to transmit illuminating commands.

After triggering (e.g. after some or each triggered shot), the setting values of the illuminating commands may vary with time. For example, as shown in FIGS. 4G and 4H, the controller 14 uses a fourth set of instructions 104 as the basic set of instructions, to transmit illuminating commands which vary with time at indicated time periods after receiving the trigger signal. The fourth set of instructions 104 includes a seventh instruction and an eighth instruction. The seventh instruction includes a setting value (for illuminating component 181): 100% emission ratio, at indicated time period: 300 μs~600 μs; and a setting value: 50% emission ratio, at indicated time period: 900 μs~1500 μs. The eighth instruction includes a setting value (for illuminating component 182): 50% emission ratio, at indicated time period: 600 μs~1200 μs; and a setting value: 100% emission ratio, at indicated time period: 1200 μs~1800 μs. In such a manner, as shown in FIG. 4I, the red light trail #FF0000, a light mixing trail #FF8000 (Dark Orange), a light mixing trail #7F7F00 (Olive), a light mixing trail #80FF00 (Chartreuse) and a Lime light trail #00FF00 could be obtained in order.

Figure 4K:
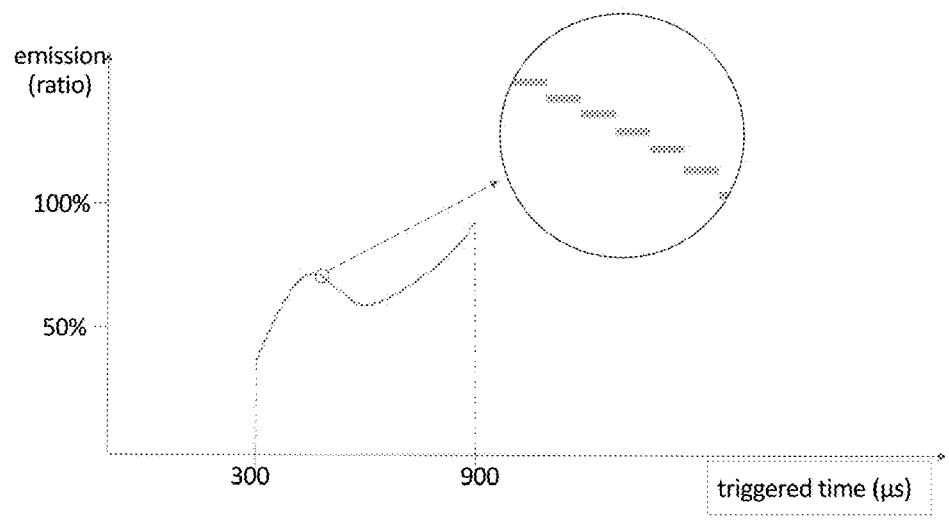

Another embodiment shows how to obtain a visual effect with more layers, as shown in FIG. 4J, by using three tunable illuminating components: a red first illuminating component R, a green second illuminating component G and a blue third illuminating component B. The controller 14 may use a fifth set of instructions 105 as the basic set of instructions, including indicated time periods: A(300 μs to 700 μs), B(700 μs to 1100 μs), C(1100 μs to 1300 μs), D(1300 μs to 1500 μs), E(1500 μs to 1600 μs), F(1600 μs to 1650 μs) and G(1650 μs to 1675 μs), to obtain a light mixing trail #144B0C (Myrtle), a light mixing trail #32771E (Bilbao), a light mixing trail #EEC957 (Cream Can), a light mixing trail #D22939 (Brick Red), a light mixing trail #880A1F (Burgundy), a light mixing trail #5F4672 (Honey Flower) and a light mixing trail #393659 (Jacarta) in order. The controller 14 may gradually shorten the periods of indicated time, to obtain a subtle change in the visual effect of the light beam. Furthermore, how to adjust the illuminating components is not limited to the square shape (digital shape) configuration as shown in FIG. 4H. The present invention may adopt an analog shape configuration (e.g., a wave shape configuration), as shown in FIG. 4K, to make the beam effect vary more smoothly. For example, the controller 14 may include as many indicated time periods with different setting values as possible in an extremely short period of time (e.g., more than 10 indicated time periods with different setting values within 100 μs). Different combinations of different illuminating components can be used for making the beam effect vary even more smoothly and more colorfully. The setting value may be emission ratio, emission intensity, indicated color, or Hex color code, but not limited thereto. The indicated time period may include two (or more than two) setting values.

Figure 5A:
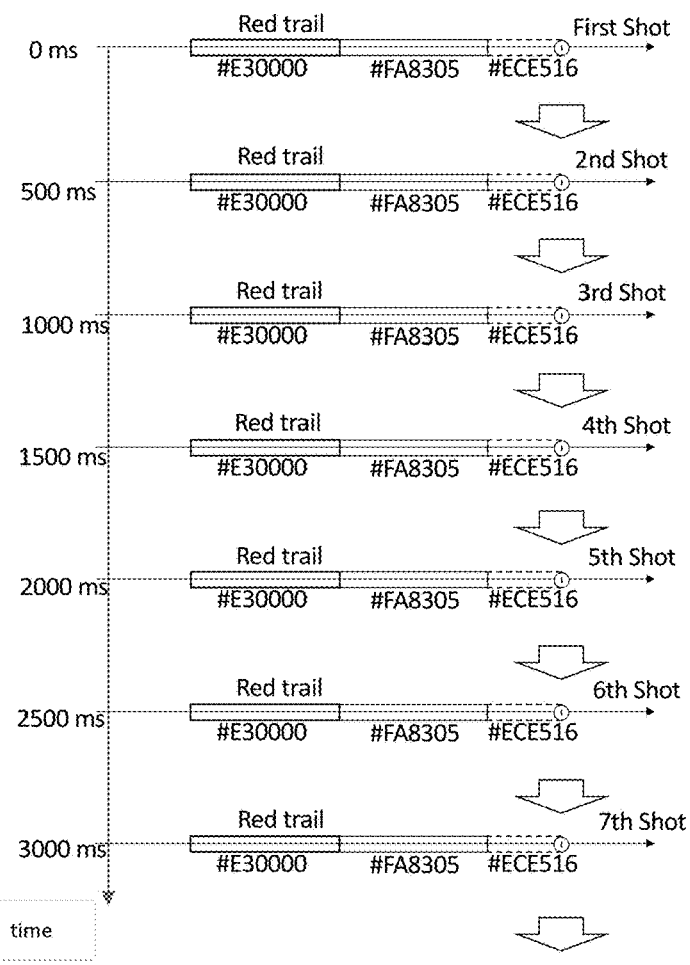
Figure 5B:
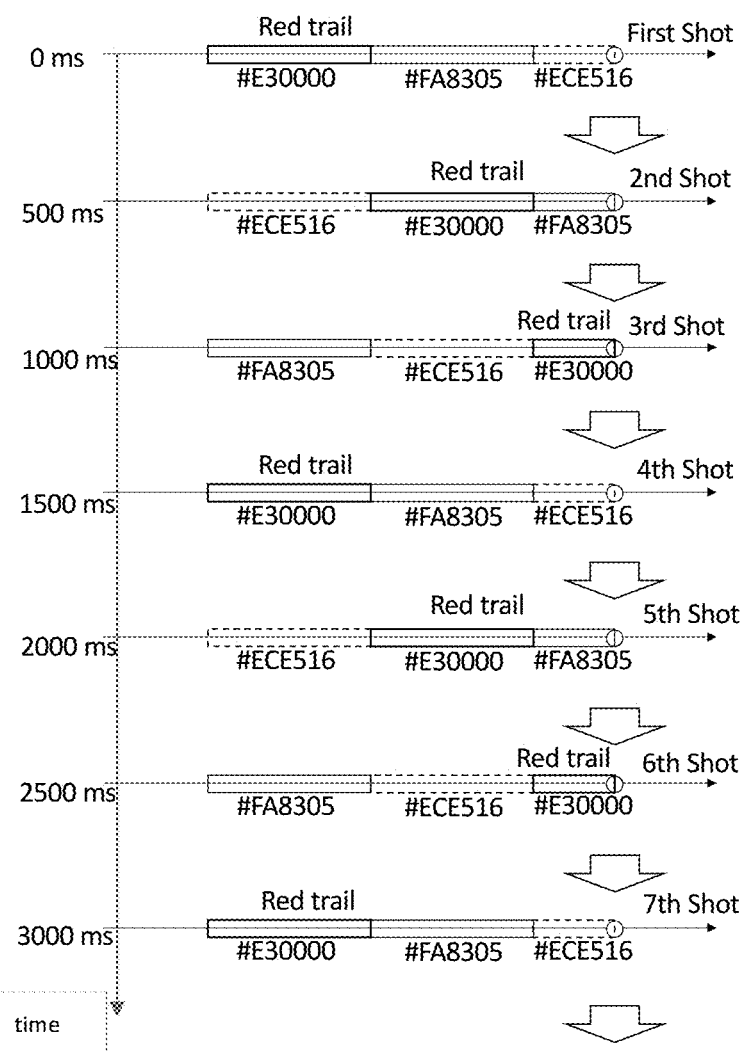

When a user shoots multiple shots (while triggered) within a short period of time. The visual effect can become boring, as shown in FIG. 5A, due to repetition. The present invention may adopt different sets of instructions for the subsequent shots to obtain a dynamic beam effect as shown in FIG. 5B.

Figures 5C, 5D:
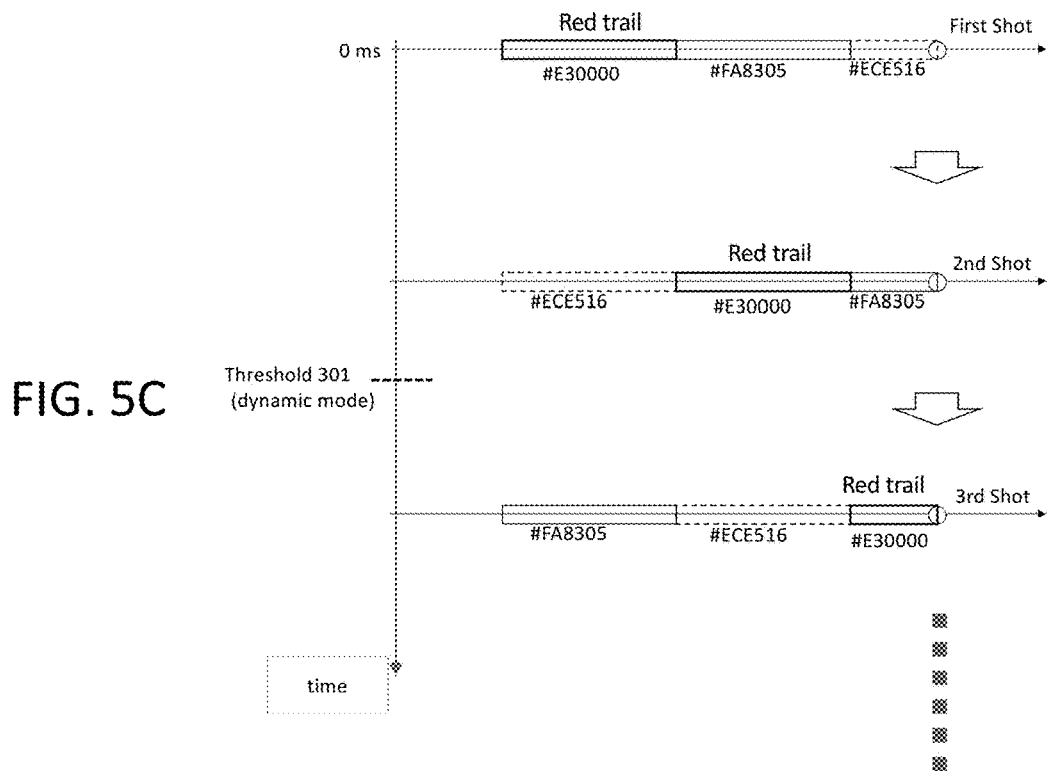

In one embodiment, the controller 14 may keep monitoring and calculating a received time interval of the trigger signal. Based on the time interval, the controller 14 can determine whether the user is shooting continuously or not. For example, as shown in FIG. 5C, the simulator 10 may be configured to predefine a dynamic mode threshold (Threshold for activating) 301 to be 600 ms. If the next trigger signal is received within 600 ms, the simulator 10 may automatically activate the dynamic mode: using a plurality of predetermined modes (instruction sets) to control the illuminating components sequentially, the individual trace #E30000, the trace #FA8305 and the trace #ECE516 are specified at different times in the individual shot. FIG. 5D shows a first combination of the sets of instructions, comprising a sixth set of instructions 106 (for use in the first shot), a seventh set of instructions 107 (for the use of the second shot), and an eighth set of instructions 108 (for the use of the third shot). When triggered, the controller 14 uses the sixth set of instructions 106 as the basic set of instructions to transmit illuminating commands to obtain a visual effect of a three-layer light beam. When a subsequent trigger signal is received within the threshold 301, the controller 14 uses the seventh set of instructions 107 to transmit illuminating commands, wherein at least one setting value of the seventh set of instructions 107 is different from the corresponding setting value of the sixth set of instructions 106 to obtain another beam effect different from the previous shot. For example, how the setting values vary with time may be the same but the indicated time periods are different, or the setting values are different at the same indicated time period. The amount of the combination of the sets of instructions may be more than three (e.g., four to ten, or even more), to obtain a more dynamic beam effect.

The foregoing embodiment may be configured to: when receiving a subsequent trigger signal from the first detector 16, the controller 14 uses a subsequent set of instructions to transmit illuminating commands to the illuminating components, wherein at least one setting value in the subsequent set of instructions is different from the corresponding setting value of said basic set of instructions. In this way, when the user continuously shoots, a variety of different modes of light trails are left in sequence, resulting in a dynamic beam effect as shown in FIG. 5B.

However, when the subsequent shot is triggered too quickly, the aforementioned pre-adjusted dynamic beam effect will not be able to be generated as desired. For example, if you want to show a dynamic beam effect of a red trail and then switch to a green trail, when the subsequent shot is triggered too quickly, it will be directly mixed into a yellow trace.

Figure 5E:
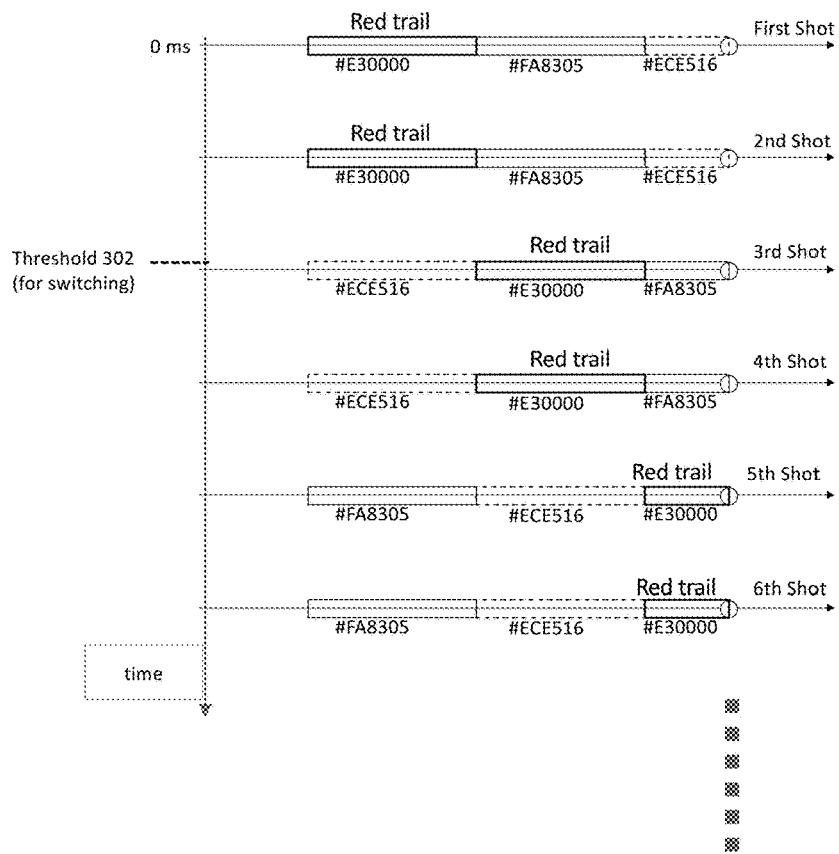
Figure 5F:
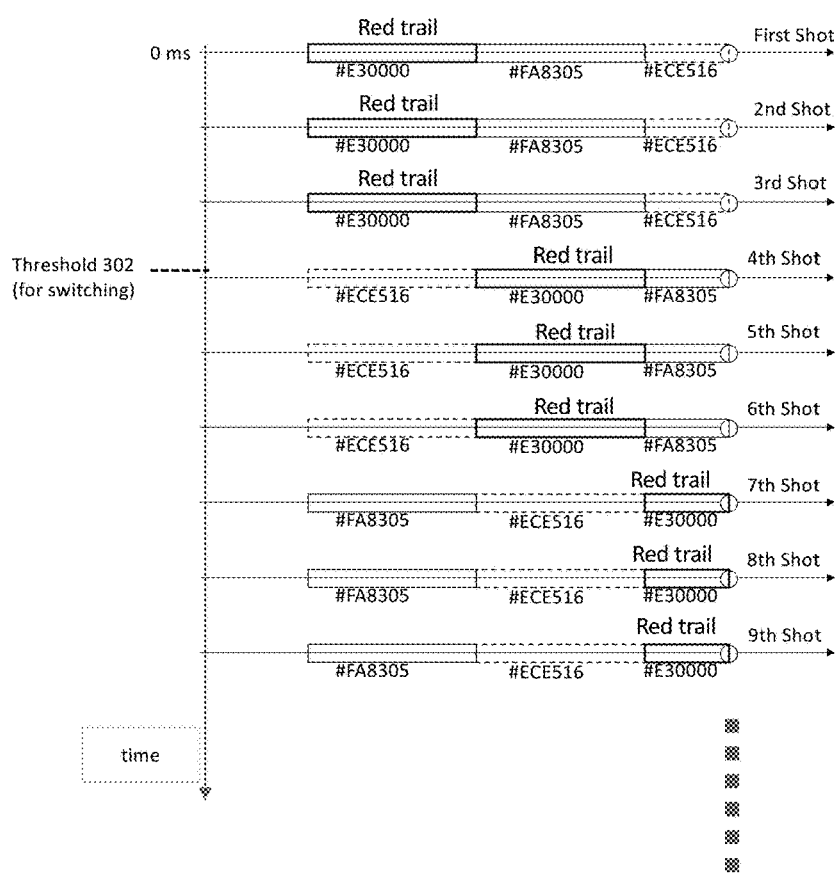
Figure 5G:
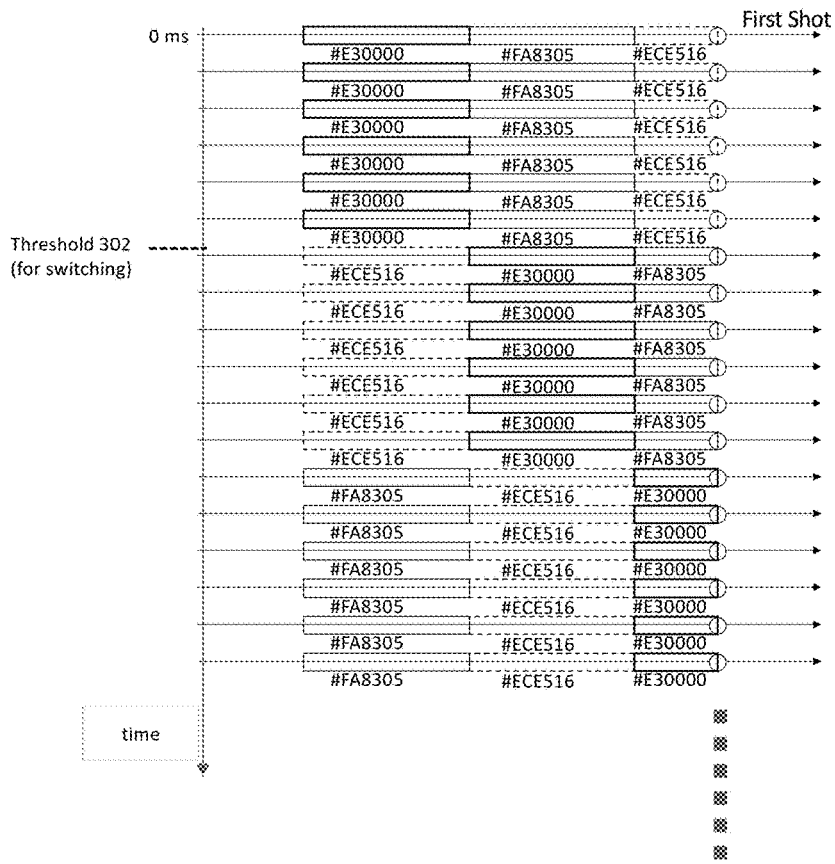

As shown in FIGS. 5E, 5F, and 5G, a second threshold 302 for keeping using the same pattern (set of instructions) may be defined to make sure the next pattern will not be used if the time interval is shorter than the threshold 302. For example, keeps using the same pattern until the time interval between the first shot and the current shot is exceeding the threshold 302, then switches to the next pattern.

For example, the threshold 302 may be 300 ms. When the time interval between the first shot and the current shot is less than 300 ms, no matter there are 2, 3, 6, even more than a dozen shots within 300 ms, keeps using the instructions 106 until exceeding 300 ms, then switches to instructions 107 several shots until the time interval between the first shot of instructions 107 and the current shot exceeding 300 ms, then switched to next instruction, etc. In other words, the controller 14 is configurable with the threshold 302 related to the time interval of receiving trigger signals. In response to receiving the subsequent trigger signal within the threshold 302, the controller 14 keeps using the basic set of instructions to transmit the illuminating commands; and in response to receiving the subsequent trigger signal exceeding the threshold 302, the controller 14 uses a next set of instructions different from the basic set of instructions to transmit the illuminating commands for subsequent shots. In such a manner, although during switching the patterns the undesired mixed effect will still happen, but generally a dynamic beam effect having three sets of patterns can still be obtained in order. The value of the threshold 302 may be less than the threshold 301. Because the threshold 302 is the configuration to make sure that the dynamic beam effect can be obtained after activating the dynamic mode (by threshold 301)

Figure 5H:
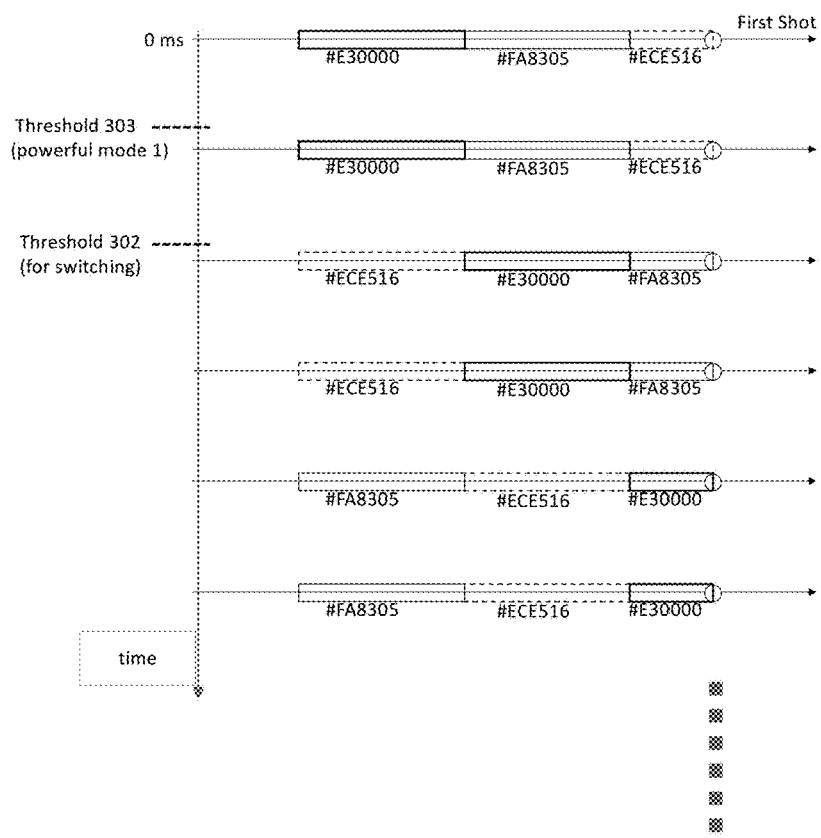
Figure 5I:
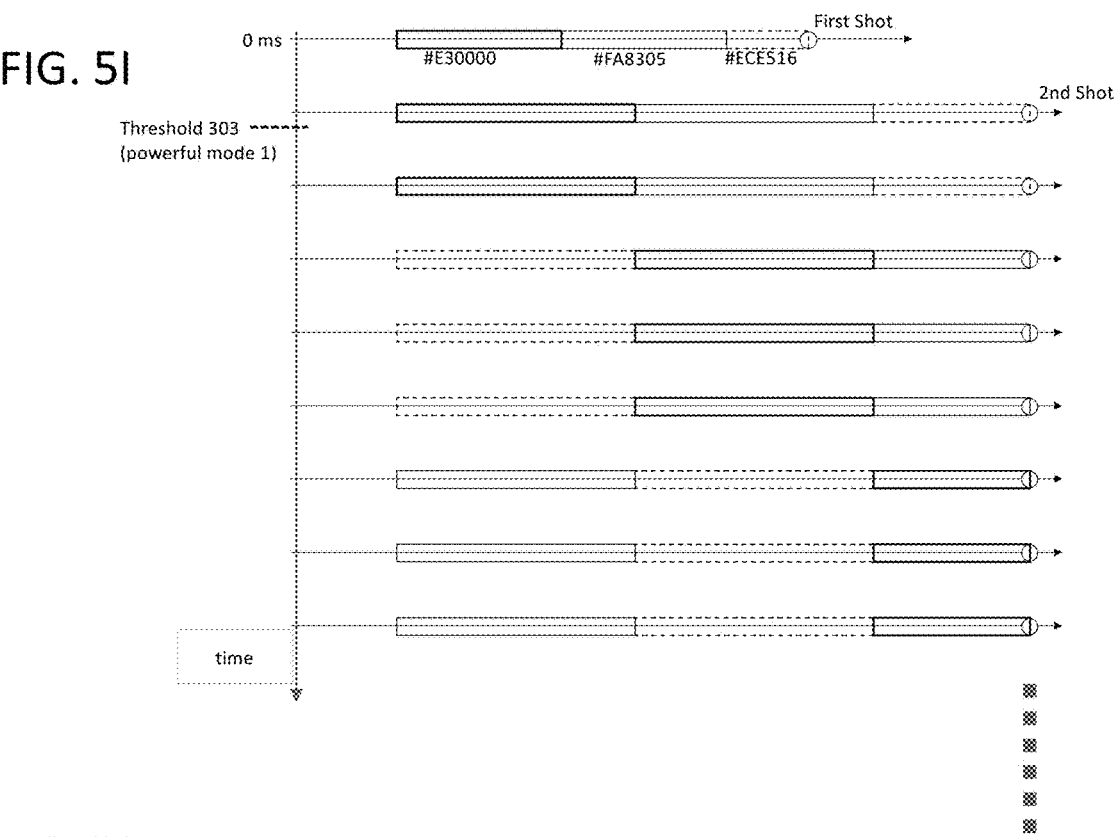
Figure 5J:
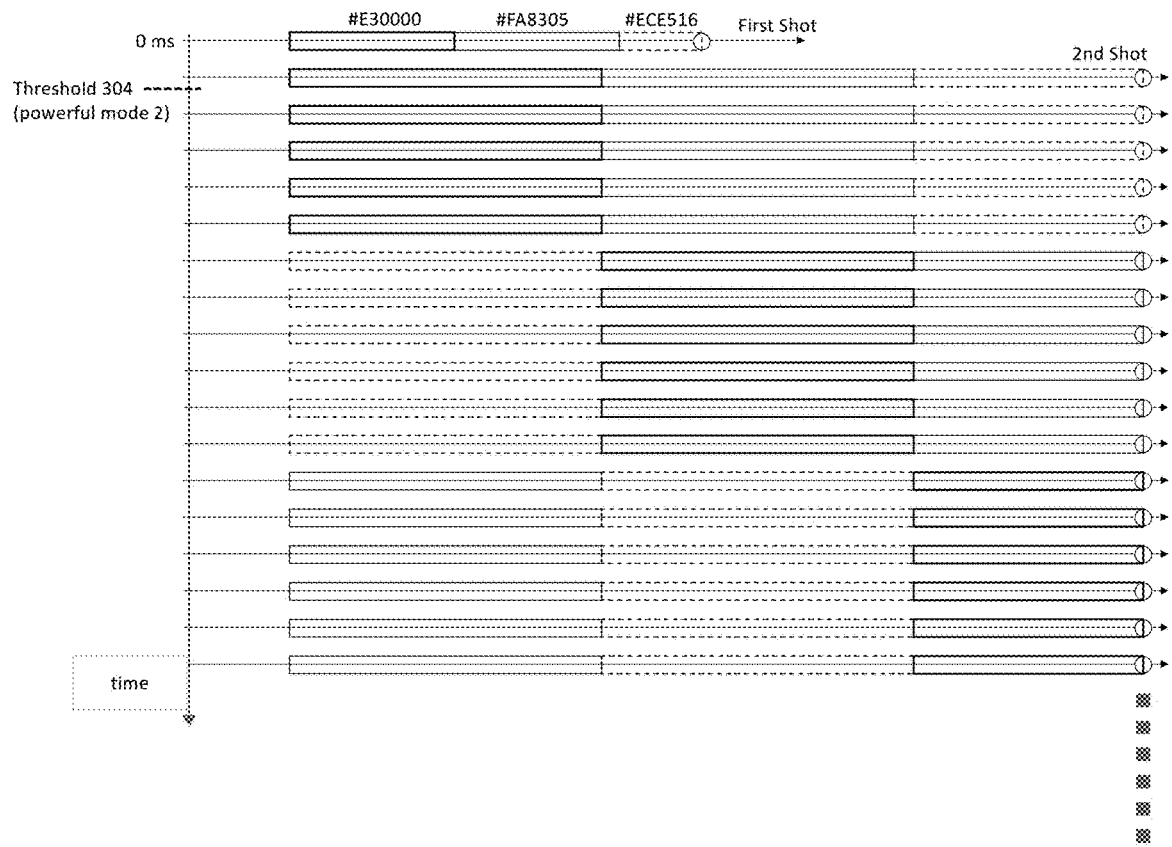

As shown in FIGS. 5H, 5I, and 5J, the controller 14 may be configurable with a third threshold 303 related to the time interval of receiving trigger signals. In response to receiving the subsequent trigger signal within the threshold 303, the controller 14 may increase each indicated time period of the current instructions to transmit illuminating commands for subsequent shots, so that when more shots within a short period of time, the length of each beam effect will become longer. The value of the threshold 303 and the threshold 304 may be less than the threshold 302, when the thresholds 303 and 304 are configured to further differentiate received time intervals to generate different beam effects.

As shown in FIG. 5H, in one embodiment, when the next shot is triggered within the threshold 302 but not the threshold 303, uses the first combination of the sets of instructions (106, 107, and 108) and keeps using the same pattern until exceeding the threshold 302. However, when the next shot is triggered within the threshold 303, as shown in FIG. 5I, uses the first combination of the sets of instructions (106, 107, and 108) but increases each indicated time period of the instructions. Furthermore, when the next shot is triggered within the threshold 304, as shown in FIG. 5J, further increases each indicated time period of the instructions to obtain an even longer beam effect.

How to increase each indicated time period of the instructions is not limited to be proportional. For example, for the threshold 303, each indicated time period of the instructions may be: a basic period (being the same to the threshold 302)+one unit (e.g., 400 μs+0.5(400 μs)=600 μs). For the threshold 304, each indicated time period of the instructions may be: a basic period (being the same to the threshold 302)+two units (e.g., 400 μs+0.5(400 μs)*2=800 μs).

Please be noted that the exemplary configurations in FIGS. 5C to 5J only uses one combination of the sets of instructions (e.g., 106, 107, and 108), and then modify the setting values based on said plurality of thresholds associated with the plurality of different time intervals in response to receiving a subsequent trigger signal within any one of the plurality of thresholds. The controller 14 may also just include a plurality of combinations of the sets of instructions. When receiving multiple trigger signals in the range of 100 ms to 600 ms, the first command set combination may be selected. When receiving multiple trigger signals in the range of 30 ms to 100 ms, choose to use a second command set combination. When receiving multiple trigger signals in the range of 25 ms to 30 ms, select a third combination of the sets of instructions.

In one embodiment, when the time interval between receiving the trigger signal is not so fast, for example, when receiving multiple trigger signals in the range of 100 ms to 600 ms, the controller 14 uses the first combination of the sets of instructions: the sixth set of instructions 106, the seventh set of instructions 107 and the eighth set of instructions 108, to send illuminating commands. The continuous firing will obtain three patterns of dynamic beam effect in turns.

When the time interval between receiving the trigger signal is fast to a certain extent, for example, when receiving multiple trigger signals in the range of 30 ms to 100 ms, the second combination of the sets of instructions is used: the sixth set of instructions 106, the sixth set of instructions 106, the sixth set of instructions 106, the seventh set of instructions 107, the seventh set of instructions 107, the eighth set of instructions 108, the eighth set of instructions 108, the eighth set of instructions 108, the eighth set of instructions 108. This continuous shot takes turns to produce a dynamic beam effect in three patterns, each of which is reused three times. When the time interval between receiving the trigger signal is further faster to a certain extent, for example, when receiving multiple trigger signals in the range of 25 ms~30 ms, use the third combination of the sets of instructions (as shown in FIG. 5K): the sixth set of instructions 106 cumulative ten times, the seventh set of instructions 107 cumulative ten times, the eighth set of instructions 108 cumulative ten times. The continuous shots will produce three patterns of dynamic beam effect in turns, wherein each pattern is reused ten times.

Figure 6A:
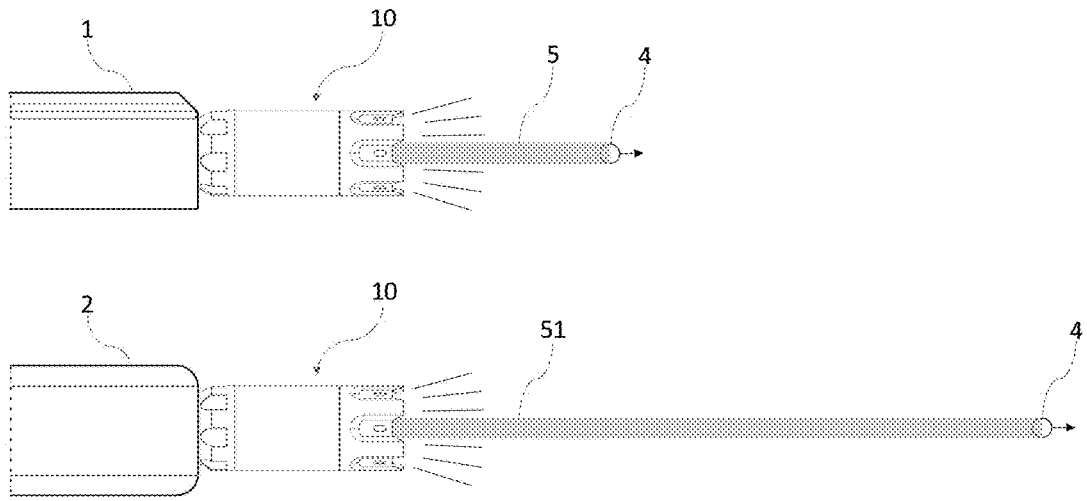
FIGS. 6A-6E shows an embodiment, comprising a plurality of detectors for calculating the velocity of projectiles and then further adjusting each specified time period.

How fast the projectile 4 can fly (i.e., velocity) when shot from different airsoft guns may be different. The velocity of a flying projectile from some airsoft pistols may be 30 m/sec only, while the velocity of the flying projectile from other airsoft rifles may be as high as 180 m/sec. While the indicated time period is the same, but the velocity of the flying projectile is higher, the length of the beam effect will be longer. For example, as shown in FIG. 6A, an airsoft rifle 2 can shoot the flying projectile at a velocity of 90 m/sec; and the airsoft pistol 1 can shoot the flying projectile at a velocity of 30 m/sec. When both airsoft guns using the same simulator 10 for shooting, if the setting is also the same, the trail 51 obtained by the airsoft rifle 2 will be longer than the trail 5 obtained by the airsoft pistol 1. When the velocity of the flying projectile is too high, the length of the beam effect will be too long. This is a problem since the simulator 10 is trying to simulate the visual effect of real firearm.

Figure 6B:
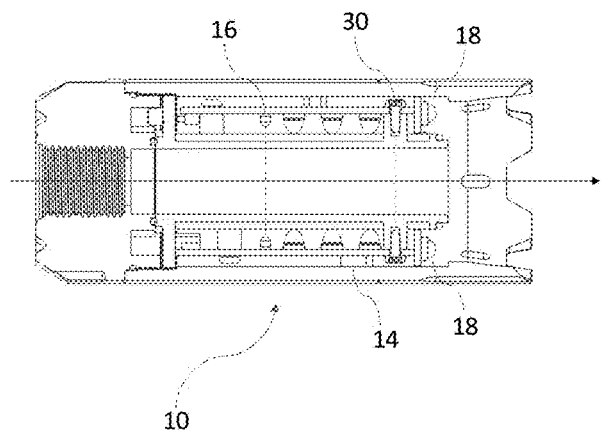
Figure 6C:
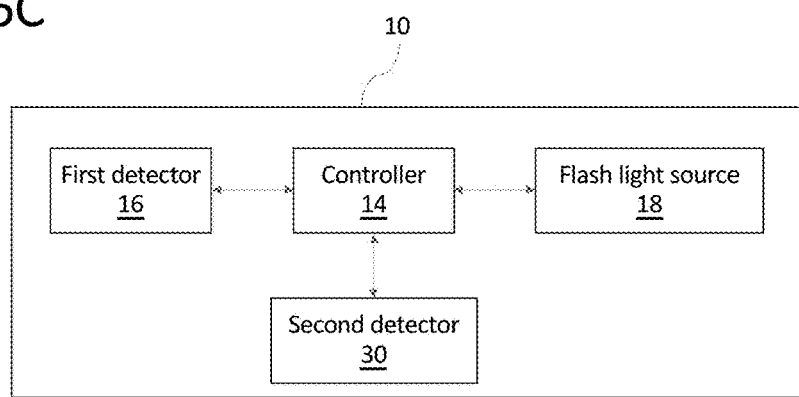
Figure 6D:
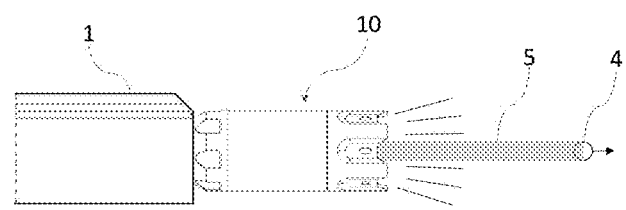
Figure 6D:
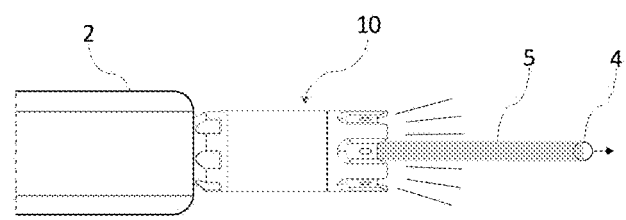
Figure 6E:
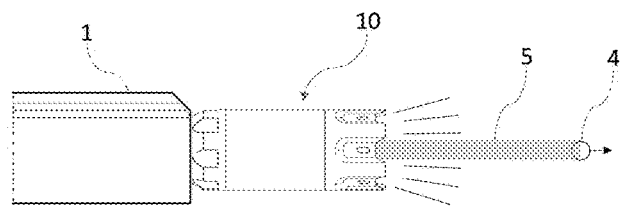
Figure 6E:
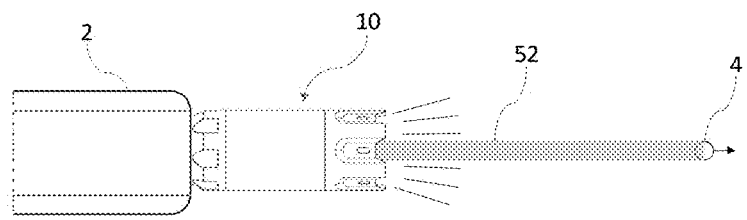

To solve said problem, the simulator 10 may further include a second detector 30, as shown in FIGS. 6B and 6C. The second detector 30 is coupled to the controller 14 and configured with the first detector 16 to calculate the velocity of the projectile 4 passing through the detectors. The detectors may be disposed in substantially parallel to the passage 12. The controller 14 may adjust a duration of each indicated time period of the instructions based on the calculated velocity. As shown in FIG. 6D, the airsoft rifle 2 may obtain the trail 5 like the airsoft pistol 1. The beam effects having different lengths in FIG. 6A may be adjusted to the beam effects having the same length in FIG. 6D, but not limited thereto. As shown in FIG. 6E, the controller 14 may adjust each indicated time period by a predetermined ratio, so that when the velocity is extremely fast (e.g., 180 m/sec), a trail 52 having a reasonable length may still be obtained.

Figure 7A:
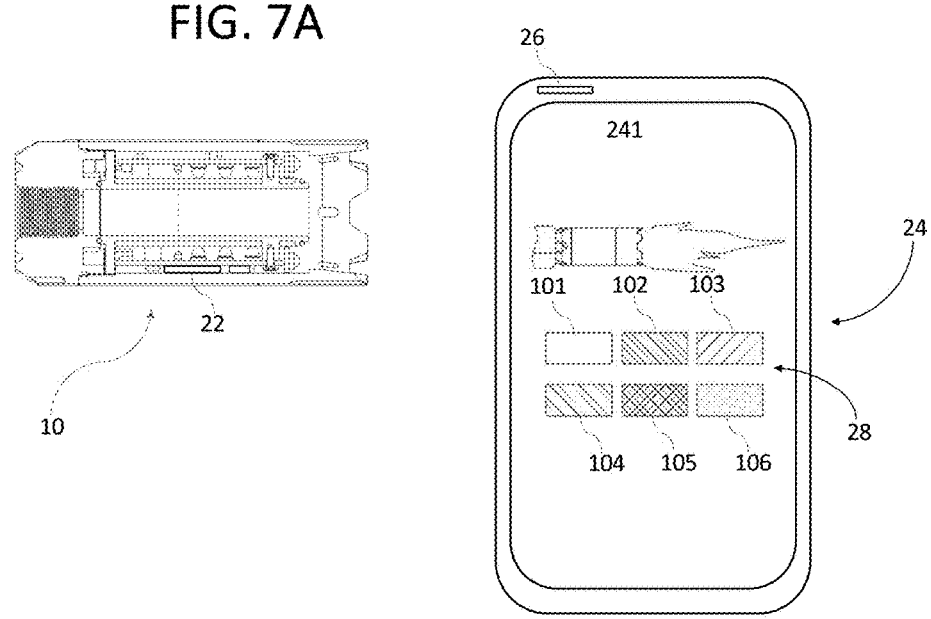
FIGS. 7A-7F illustrate a muzzle flash simulator further including a communication unit for various user interfaces in other embodiments.
Figure 7B:
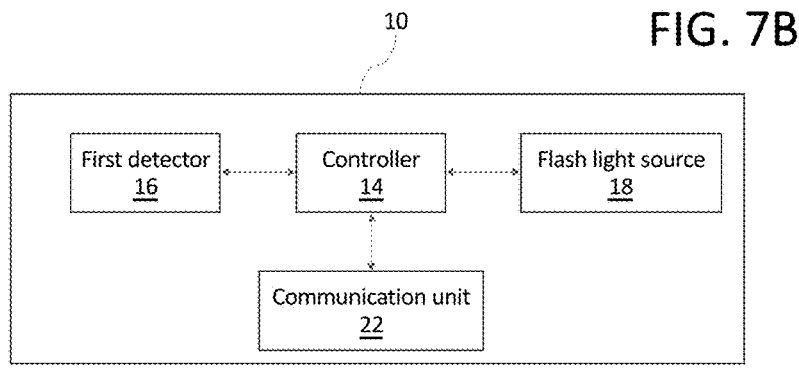

A conventional airsoft tracer usually only has one physical switch for power on/off. It would be hard for the user (compared to the manufacturer) to choose desired color. The simulator 10 could further include a communication unit 22. As shown in FIGS. 7A and 7B, the communication unit 22 can wirelessly communicate with a wireless device 24 (e.g., a smartphone, a notebook, etc.) via a communication unit 26 disposed on the wireless device 24. The wireless device 24 may have a user interface 28, on a touch screen 241, configured to allow the user to choose a predetermined (fine-tuned) pattern (e.g., 101, 102, 103, 104, 105, or 106) for different color-varying effects or a predetermined dynamic beam effect.

Figure 7C:
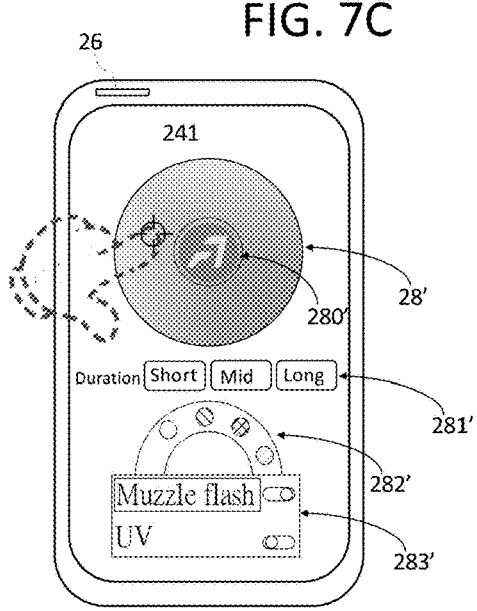

In another embodiment, as shown in FIG. 7C, the user can choose desired color via a user interface 28', a color wheel adjustment interface, wherein a plurality of selectable options are all included in the color wheel. Each option of the plurality of selectable options is associated with a respective instruction. An interface 280' may display the selected color. For example, a color option A is selected and shown in the interface 280'; the user may adjust the duration of the indicated time periods via an interface 281' to further shorten or lengthen desired light beam effect; the user may choose the predetermined pattern or dynamic beam effect via a user interface 282'; and the user may turn on/off specific functions (e.g., muzzle flash, UV tracer, etc.) of the simulator 10, via a user interface 283.

Figure 7D:
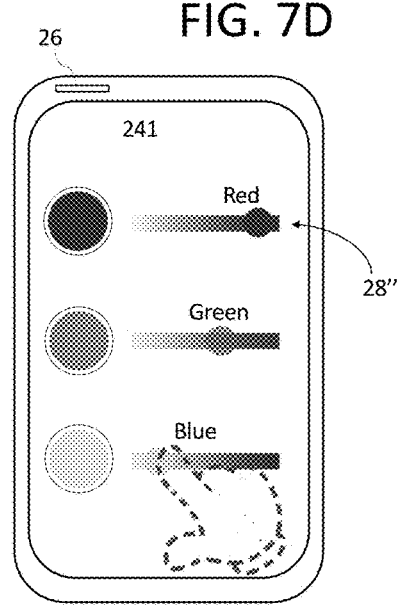
Figure 7E:
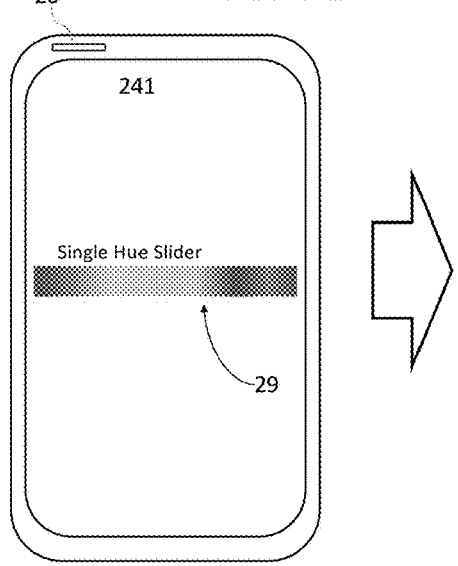
Figure 7F:
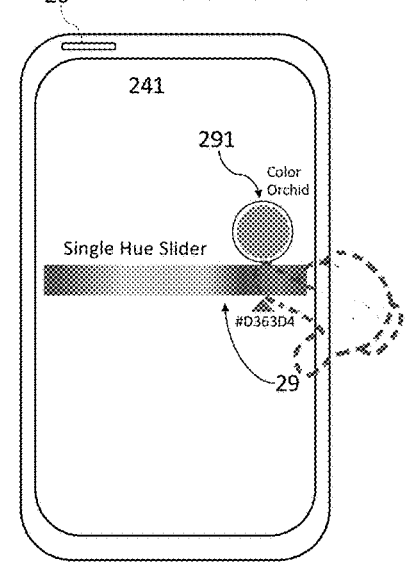

In another embodiment, as shown in FIG. 7D, the user may independently adjust each tunable illuminating component via an interface 28" (a plurality of slider bars). As shown in FIG. 7E, the user may also adjust all tunable illuminating components via an interface 29 (single hue slider). As shown in FIG. 7F, when the user selects a specific color (option), an area near interface 29 may further display a sign and an interface 291 to display the selected color.

In another embodiment, when using an RGB LED (red, green, and blue light-emitting diode, as shown in FIG. 2D), the techniques of this disclosure may be applied with respect to weapon-mounted lights (lighting equipment for the real gun or toy gun). A problem of the majority of weapon-mounted lights on the market today is that the user has to use push-to-activate buttons for switching the operation modes manually (the user can't do it without pushing the buttons). The other problem is that the user can't easily control the intensity of the light when required. It may result in being too bright or too weak when needed. The other problem is that when the user forgets to turn off the switch, the battery will be dead already when the user needs to use it. The other problem is that the user can't easily stay in a specific function when needed. The user needs to use push-to-activate buttons for staying in the needed function.

Figure 8A:
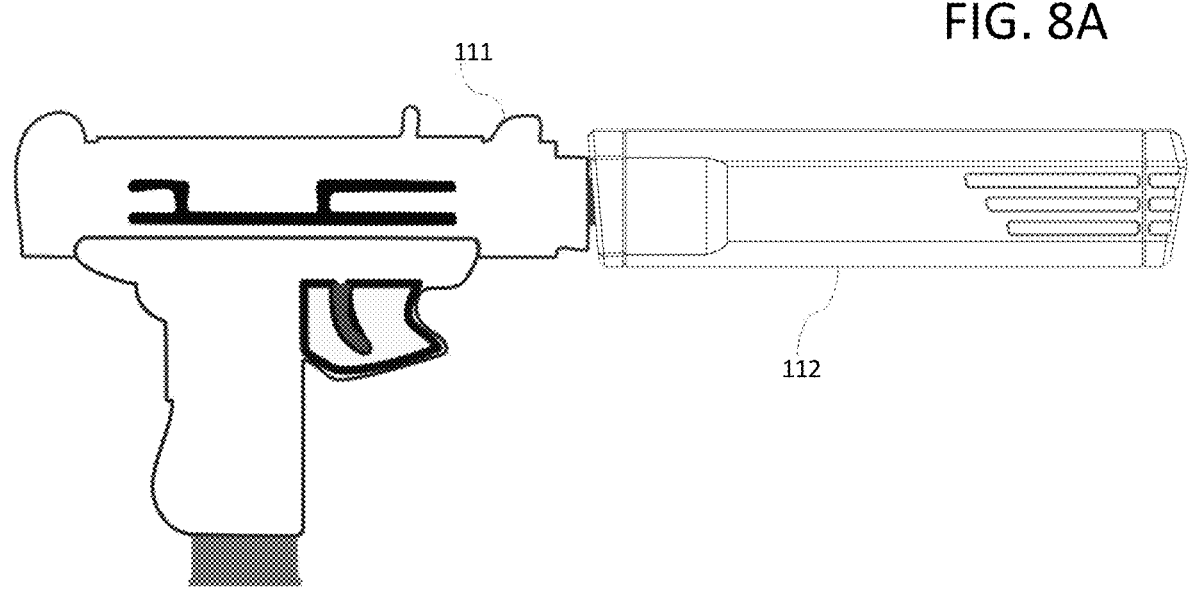
FIGS. 8A-8E illustrate when a light device is tilted past certain angles, the light device may turn on/off specific functions.

The invention can further provide a different control method and motion detection modes. When one of the motion detection modes is activated, the mounted light switches between operation modes automatically according to detected angle variations (in vertical or horizontal position). The motion detection modes may further include setting values associated with the detected angles. Please refer to FIG. 8A, a mounted light device 112 may be adapted to airsoft gun 111. The mounted light device 112 may include said motion detection modes. When the motion detection modes are activated, the light device 112 may switch between operation modes according to detected angle variations in vertical position. For example, switch on the device or turn off it. The light device 112 may also switch between operation modes according to detected angle variations in the horizontal position (for example, roll rotation).

Figure 8B:
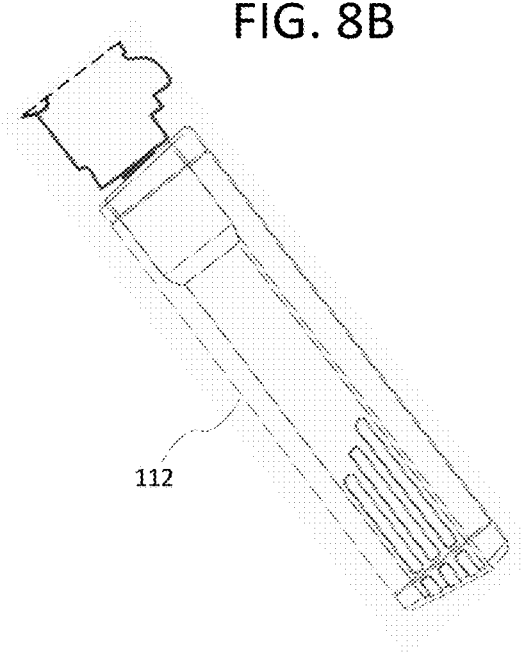
Figure 8C:
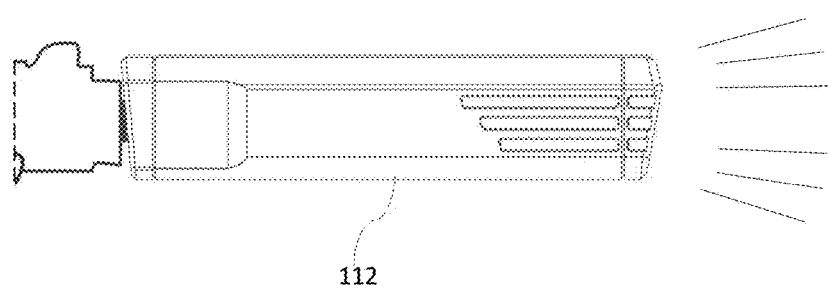

Please refer to FIG. 8B, when the device is tilted past a certain angle the light device 112 may turn off specific functions (for example, lighting). Please refer to FIG. 8C, when orientation detected to be leaning forward past a certain angle, the light device 112 may turn on specific functions (for example, lighting).

For ease of understanding, the following angle of the light device 112 may be defined: When the direction is oriented substantially parallel to the ground (in vertical or horizontal position), the direction has an angle of 0 degrees. When the direction is pointing downward (below the horizontal), the value of the degree is with a negative angle value. When the direction is pointing upward (above the horizontal), the value of the degree is with a positive angle value.

Figure 8D:
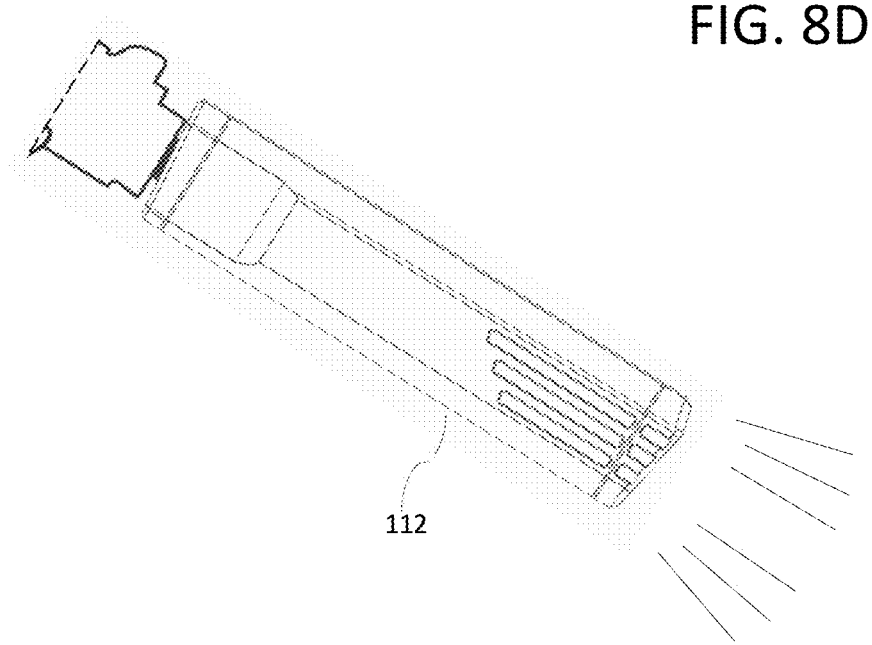
Figure 8E:
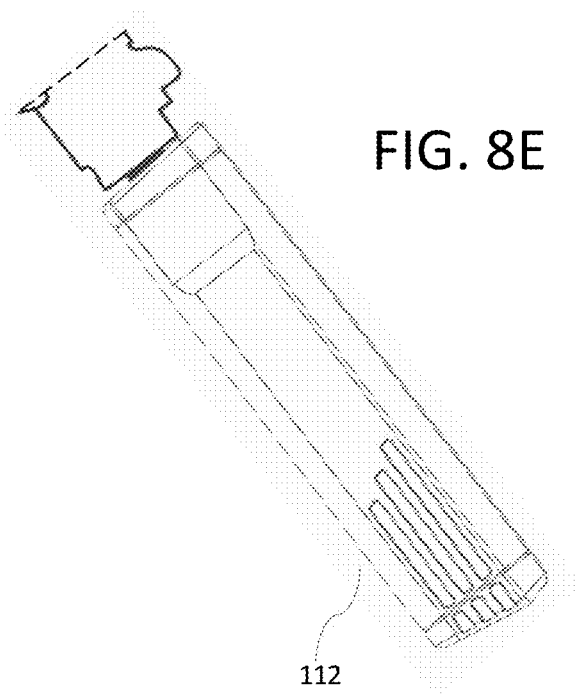

Please refer to FIG. 8D, for example, when orientation is detected to be leaning forward past an angle of −60 degrees, the light device 112 may turn on the lighting. Please refer to FIG. 8E, when orientation is detected to be leaning forward past an angle of −70 degrees, the light device 112 may turn off the lighting.

The light device 112 is not limited to using an RGB LED. The light device 112 may use a white LED, or RGB+W LED in one Chip. The light device 112 may have multiple predefined modes of operation. For example, a really bright brightness of 3 W; a weaker brightness of 1 W; or strobe mode (rapid on and off of the light). The light device 112 may use MCU or G sensor for determining the angle and switching modes. The light device 112 may have multiple switches for power and functions.

Figure 9A:
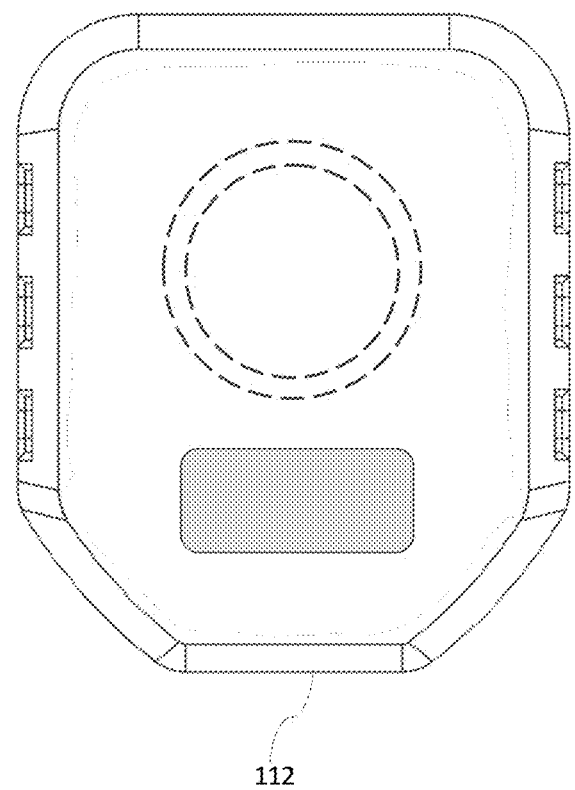
Figure 9B:
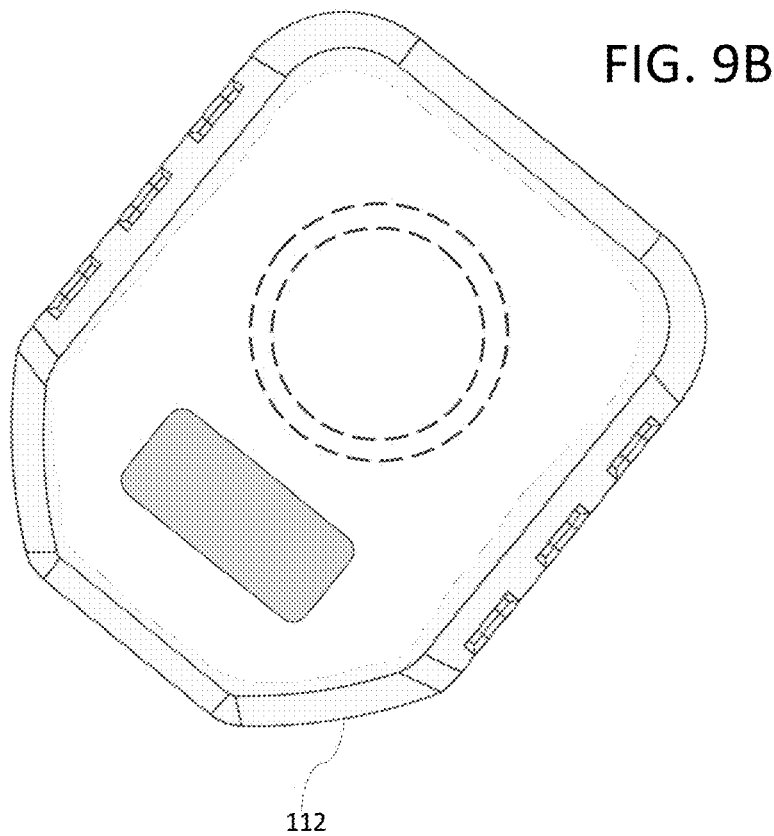
Figure 9E:
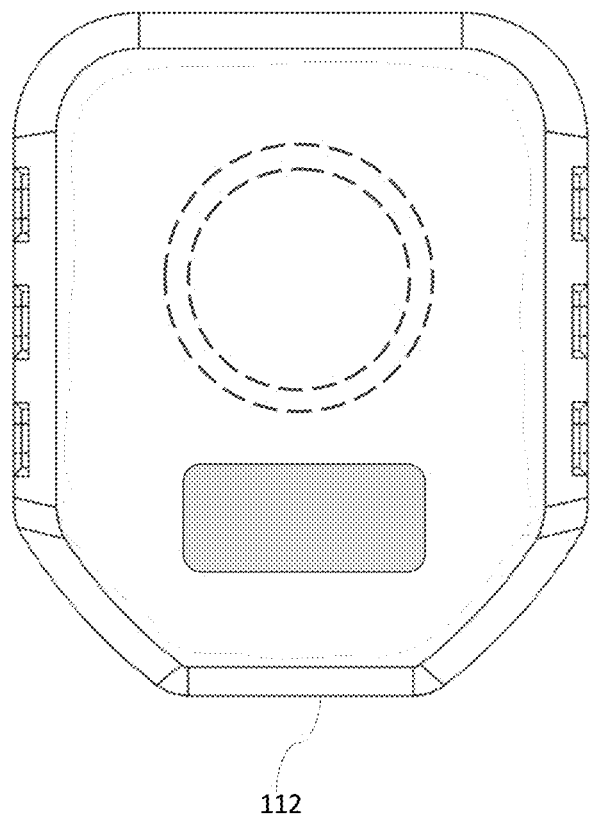

The motion detection modes may have the following setting: When activated, the light device 112 may switch between operation modes according to detected angle variations in vertical position. For example, when orientation is detected to be leaning forward past an angle of −60 degrees, the light device 112 may turn on the lighting automatically; when orientation is detected to be leaning forward past an angle of −70 degrees, the light device 112 may turn off the lighting automatically; Rotating Right: When the current angle is between −20 and +20 vertically, rotating right past 60 degrees (as shown in FIG. 9B), and then return to 0 degrees (as shown in FIG. 9A), the light device 112 may automatically switch to the next predefined mode (as shown in FIG. 9C). Rotating Left: When the current angle is between −20 and +20 vertically, rotating left past 60 degrees (as shown in FIG. 9D), and then return to 0 degrees (as shown in FIG. 9E), the light device 112 may automatically switch to the previous predefined mode; Go up to 90 degrees and then return to the 0 degree vertically (as shown in FIG. 10A to 10B): Maximum brightness (self-Define).

The above definition may also be: 0 degrees when the left and right directions are perpendicular according to the normal angle when holding gun; 0 degrees when the front and back directions are parallel to the ground; the downward angle is with a negative value, and the upward angle is with a positive value. The said embodiments are not limited by any of the details of the description, but rather should be considered broadly within its scope as defined in the appended claims. All changes and modifications that fall within the metes and bounds of the claims are intended to be embraced by the appended claims.

What is claimed is:

1. A muzzle flash simulator for briefly illuminating light on a projectile passage in front of the muzzle flash simulator after triggered, comprising: an internal passage disposed through the muzzle flash simulator; a detector configured to transmit a trigger signal to a controller in response to detecting a projectile passing through the internal passage; a first illuminating component coupled to the controller; and a second illuminating component coupled to the controller, wherein the controller transmits illuminating commands to the illuminating components in response to receiving the trigger signal from the detector and uses a basic set of instructions to transmit the illuminating commands; each instruction of the basic set of instructions includes a setting value for each one of the illuminating components at an indicated time period; and when receiving a subsequent trigger signal from the detector, the controller uses a subsequent set of instructions to transmit the illuminating commands to the illuminating components, wherein at least one setting value in the subsequent set of instructions is different from the corresponding setting value of said basic set of instructions.

* * * * *